(12) United States Patent
Mizuta et al.

(10) Patent No.: US 9,827,783 B2
(45) Date of Patent: *Nov. 28, 2017

(54) IMAGE FORMING APPARATUS

(71) Applicant: CANON KABUSHIKI KAISHA, Tokyo (JP)

(72) Inventors: Takayuki Mizuta, Numazu (JP); Masayoshi Takahashi, Mishima (JP)

(73) Assignee: CANON KABUSHIKI KAISHA, Tokyo (JP)

(*) Notice: Subject to any disclaimer, the term of this patent is extended or adjusted under 35 U.S.C. 154(b) by 28 days.

This patent is subject to a terminal disclaimer.

(21) Appl. No.: 14/954,984

(22) Filed: Nov. 30, 2015

(65) Prior Publication Data

US 2016/0085173 A1     Mar. 24, 2016

Related U.S. Application Data

(63) Continuation of application No. 13/722,484, filed on Dec. 20, 2012, now Pat. No. 9,227,427.

(30) Foreign Application Priority Data

| Dec. 28, 2011 | (JP) | 2011-289106 |
| Oct. 10, 2012 | (JP) | 2012-225309 |
| Dec. 17, 2012 | (JP) | 2012-274676 |

(51) Int. Cl.
   *G02B 26/12*     (2006.01)
   *B41J 2/47*      (2006.01)
   (Continued)

(52) U.S. Cl.
   CPC .............. *B41J 2/473* (2013.01); *B41J 2/442* (2013.01); *G02B 26/122* (2013.01);
   (Continued)

(58) Field of Classification Search
   CPC .... B41J 2/473; G03G 15/011; G03G 15/0121
   See application file for complete search history.

(56) References Cited

U.S. PATENT DOCUMENTS

| 5,561,285 A | 10/1996 | Sakata et al. | 250/205 |
| 5,864,355 A | 1/1999 | Bush et al. | 347/235 |

(Continued)

FOREIGN PATENT DOCUMENTS

| CN | 1238475 | 12/1999 |
| CN | 101923301 | 12/2010 |

(Continued)

OTHER PUBLICATIONS

Chinese Office Action dated Jan. 15, 2015 in counterpart Chinese Patent Application No. 201210570275.X, together with an English language translation.

*Primary Examiner* — Kristal Feggins
*Assistant Examiner* — Kendrick Liu
(74) *Attorney, Agent, or Firm* — Fitzpatrick, Cella, Harper & Scinto

(57) ABSTRACT

The detector that detects a light beam emitted from a light source of a second image forming device and reflected by a polygon mirror, and an adjustment device that performs adjustment processing of adjusting the velocity of the polygon mirror based on an output of the detector are provided. Before a first image forming device performs the image forming processing, the adjustment device performs the adjustment processing while causing the light source of the second image forming device to emit the light beam during a time period including at least a time period in which a photosensitive member of the second image forming device is emitted with the light beam. Before the adjustment processing is finished, the first image forming device starts to move a developing member to a developing position.

11 Claims, 19 Drawing Sheets

(51) Int. Cl.
  *G03G 15/043* (2006.01)
  *B41J 2/44* (2006.01)
(52) U.S. Cl.
  CPC ......... *G02B 26/123* (2013.01); *G02B 26/127* (2013.01); *G02B 26/129* (2013.01); *G03G 15/043* (2013.01)

(56) References Cited

U.S. PATENT DOCUMENTS

| | | | |
|---|---|---|---|
| 6,032,009 A | 2/2000 | Fukuzawa et al. | 399/198 |
| 6,208,367 B1 | 3/2001 | Tanimoto et al. | 347/235 |
| 6,856,338 B2 | 2/2005 | Takahashi et al. | 347/225 |
| 7,792,464 B2 | 9/2010 | Okabe et al. | 399/228 |
| 9,227,427 B2 * | 1/2016 | Mizuta | G02B 26/122 |
| 2003/0223784 A1 * | 12/2003 | Yamanaka | G03G 15/0194 399/299 |
| 2010/0247121 A1 | 9/2010 | Shimba | 399/43 |
| 2010/0316400 A1 * | 12/2010 | Murasaki | G03G 15/0131 399/49 |
| 2010/0316413 A1 | 12/2010 | Murasaki et al. | 399/228 |
| 2013/0108290 A1 | 5/2013 | Funatani et al. | 399/43 |

FOREIGN PATENT DOCUMENTS

| | | |
|---|---|---|
| JP | 7-306626 | 11/1995 |
| JP | 3290810 B2 | 6/2002 |
| JP | 2005-326541 | 11/2005 |
| JP | 2006-126714 | 5/2006 |
| JP | 2007-083601 | 4/2007 |
| JP | 2007-093771 | 4/2007 |
| JP | 2007-101636 | 4/2007 |

* cited by examiner

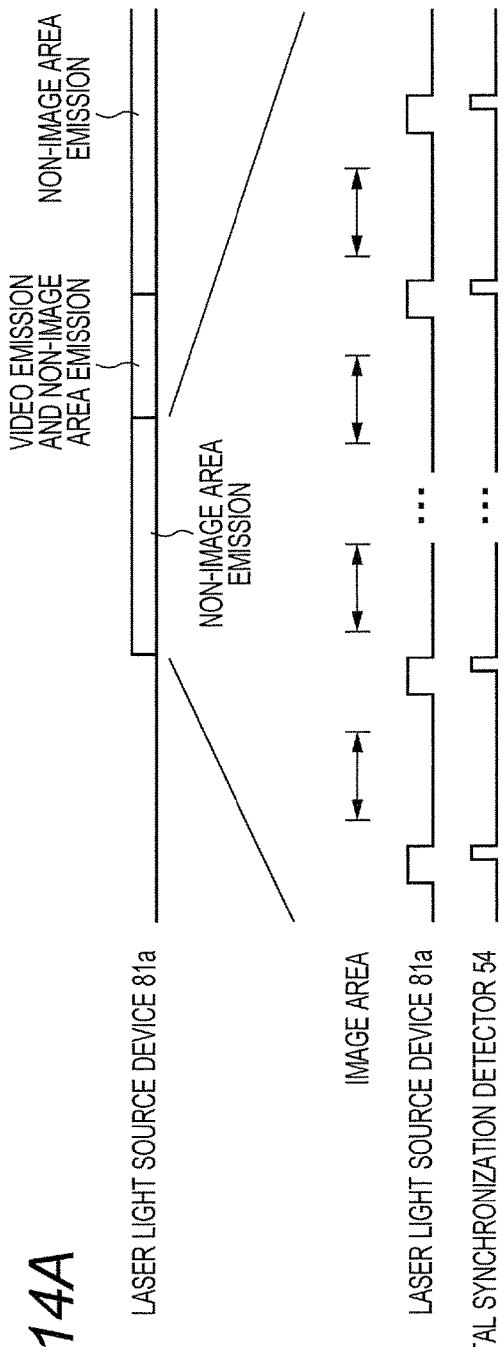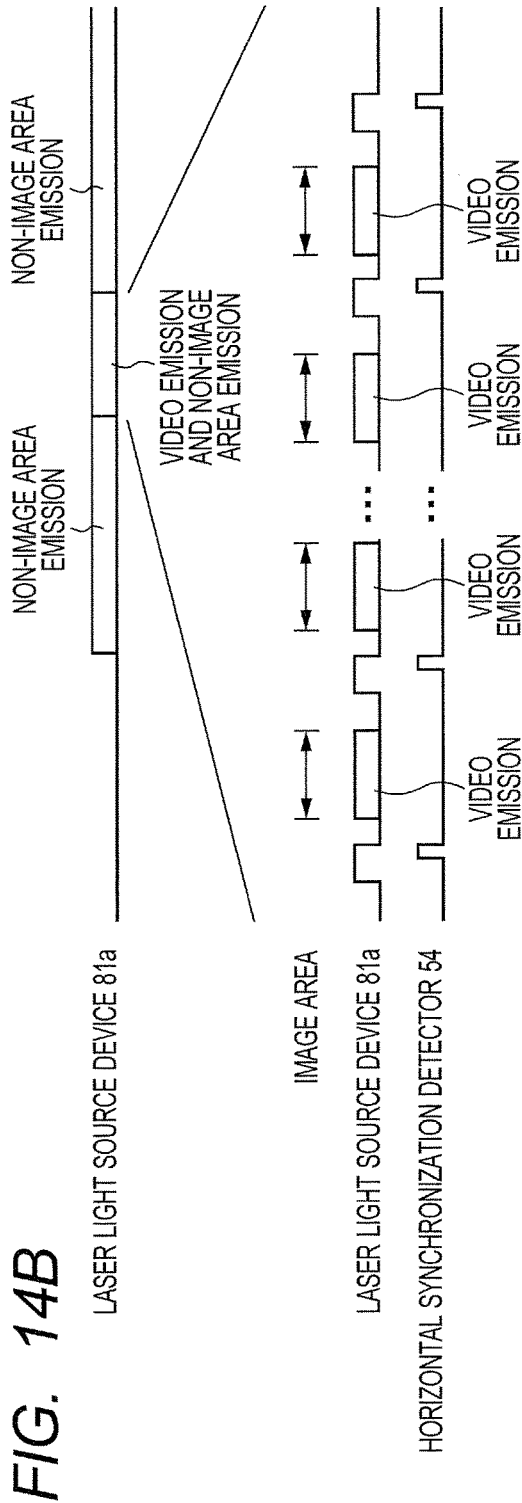

IMAGE FORMING APPARATUS

This application is a continuation of prior U.S. patent application Ser. No. 13/722,484 filed Dec. 20, 2012, the contents of which are incorporated by reference as set forth in full herein; and claims priority under §119 from Japanese Patent Application No. 2011-289106, filed Dec. 28, 2011, Japanese Patent Application No. 2012-225309, filed Oct. 10, 2012, and Japanese Patent Application No. 2012-274676, filed Dec. 17, 2012 which are hereby incorporated by reference herein in their entirety.

BACKGROUND OF THE INVENTION

Field of the Invention

The present invention relates to image forming apparatuses, for instance, a copier and a printer, that have a function of forming an image on a recording material, such as a sheet.

Description of the Related Art

Conventionally, such a type of an image forming apparatus adjusts the rotation velocity of a polygon mirror (starts up a scanner motor) such that the rotation velocity of the polygon mirror driven by the scanner motor is a velocity for performing image forming processing, before print processing onto a recording material. In this case, there is a configuration using the period of a horizontal synchronization signal detected during forcible emission with a laser beam, for detecting the rotation velocity of the polygon mirror.

In this configuration, on startup of the polygon mirror, a laser beam is emitted continuously after startup of the scanner motor, and the horizontal synchronization signal is monitored. Instead, after a time until the scanner motor reaches a target velocity, forcible emission with a laser beam is performed. During forcible emission, the horizontal synchronization signal is detected. According to the period of the detected signal, the rotation velocity of the scanner motor (polygon mirror) is detected, and the velocity is adjusted so as to be a velocity for performing image forming processing. Thus, during forcible emission with the laser beam for detecting the rotation velocity of the polygon mirror, a photosensitive member (image bearing member) is exposed to the laser beam. Accordingly, if a developing roller is in contact with the photosensitive member or a developing bias is applied to the developer, toner adheres to the photosensitive member. Unnecessary toner is transferred to a transfer unit that transfers toner to a recording material directly in contact with the photosensitive member, or a transfer unit that transfers toner to the recording material from the photosensitive member via a belt. There is a fear that, when a recording material is inserted, toner other than for a toner image formed on the recording material adheres to make the material dirty.

Japanese Patent Application Laid-Open No. H07-306626 proposes control that causes a developer to apply a low power bias such that, even if a photosensitive member is exposed to a laser beam, developing is difficult to be performed.

Japanese Patent Application Laid-Open No. 2007-93771 proposes a configuration in an in-line color image forming apparatus including a configuration causing a developer to contact with and separate from a photosensitive member; the apparatus stands by in a state where the developer is separated from a photosensitive member to prevent toner from adhering the photosensitive member, and brings the developer into contact immediately before image forming.

U.S. Pat. No. 5,864,355 proposes that a safety area is provided such that a photosensitive member is not exposed to a laser beam and the area does not overlap with an image area on a surface of the photosensitive member, and, on startup of a scanner motor, only the safety area is emitted with the laser beam and calibration is performed.

However, in the case where a low power bias is applied to the developer as with Japanese Patent Application Laid-Open No. H07-306626 to prevent the undersurface of a recording material from being made dirty by emission on the photosensitive member with a laser beam, a time is required for switching from the low power bias to a normal bias. The image forming processing cannot be operated immediate after completion of forcible emission with the laser beam. Accordingly, there is a fear of extending a first print out time (FPOT), which is a time from reception of a printing request to ejection of a first sheet of a recording material out of an apparatus. There is another fear that, in the case of exposure to a laser beam having a significantly high light intensity, a certain amount of toner adheres to a photosensitive member and developed even with a low power bias application to make the underside of a recording material dirty.

As with Japanese Patent Application Laid-Open No. 2007-93771, in the case where the developer waits in a state of separating from the photosensitive member to prevent toner from adhering the photosensitive member and the developer is brought into contact with the photosensitive member immediately before image forming, timing when the developer is brought into contact with the photosensitive member should be after the scanner motor starts up and reaches a prescribed rotation velocity for image forming processing and the state transitions to that without unexpected exposure of the photosensitive member. Accordingly, there is a fear of extending the first print out time as with the above description.

Furthermore, in the case as with U.S. Pat. No. 5,864,355 where an area that does not overlap with an image area on the surface of the photosensitive member is calculated and acquired and a laser beam is emitted, it is difficult to follow abrupt variation in velocity of the polygon mirror. There is a fear of exposing the image area on the surface of the photosensitive member. In the case where a horizontal synchronization signal cannot be acquired in the area that does not overlap with the image area on the surface of the photosensitive member, there is a fear that the scanner motor cannot be controlled. In order not to abruptly vary the speed of the polygon mirror, the acceleration of the polygon mirror is required to be kept within a certain range. In this case, a time is required until adjustment of the velocity of the polygon mirror is completed. There is a fear of extending the first print out time.

SUMMARY OF THE INVENTION

An object of the present invention is to reduce a first print out time while preventing a recording material to be made dirty in an image forming apparatus including a plurality of image bearing members.

Another object of the present invention is to provide a following image forming apparatus.

A further object of the present invention is to provide an image forming apparatus including first and second image forming devices each of which includes a photosensitive member, a light source that emits a light beam, and a developing member movable between a developing position and a retracted position retracted from the developing position, a polygon mirror that reflects each of the light beams emitted from the light sources of the first and second image forming devices, a detector that detects the light beam emitted from the light source of the second image forming device and reflected by the polygon mirror; and an adjustment device that performs adjustment processing of adjusting a velocity of a movement of the polygon mirror based on an output of the detector, wherein the first and second image forming devices are capable of performing image forming processing that forms latent images on the respective photosensitive members by allowing the polygon mirror to reflect the light beams emitted from the light sources and emitting the light beams to the photosensitive members, and develops the latent images with toner by the developing members at the developing positions, and wherein before the first image forming device performs the image forming processing, the adjustment device performs the adjustment processing while emitting the light beam from the light source of the second image forming device during a time period including at least a time period in which the light beam is emitted to the photosensitive member of the second image forming device, and before the adjustment processing is finished, the first image forming device starts moving the developing member to the developing position.

A still further object of the present invention is to provide image forming apparatus including first and second image forming devices that include a photosensitive member, a light source emitting a light beam, and a developing member movable between a developing position and a position retracted from the developing position, a polygon mirror that reflects the light beams emitted from the respective light sources of the first and second image forming devices, a detector that detects the light beam emitted from the light source of the second image forming device and reflected by the polygon mirror, and an adjustment device that performs adjustment processing of adjusting a velocity of the polygon mirror based on an output of the detector, wherein the first and second image forming devices can perform image forming processing that forms latent images on the respective photosensitive members by allowing the polygon mirror to reflect the light beams emitted from the light sources and emitting the light beams into the photosensitive members, and causes the developing members at the developing positions to develop the latent images with toner, wherein, before the first image forming device performs the image forming processing, the adjustment device performs the adjustment processing while causing the light source of the second image forming device to emit the light beam during a time period including at least a time period in which the photosensitive member of the second image forming device is emitted with the light beam, and, before the adjustment processing is finished, the first image forming device starts to move the developing member to the developing position, and wherein during a period from starting movement of the developing member of the first image forming device to the developing position to completion of the adjustment processing of the adjustment device, the light source of the first image forming device is not caused to emit the light beam.

Further features of the present invention will become apparent from the following description of exemplary embodiments with reference to the attached drawings.

BRIEF DESCRIPTION OF THE DRAWINGS

FIGS. 14A and 14B are diagrams illustrating steady state rotation control of a scanner motor.

DESCRIPTION OF THE EMBODIMENTS

Preferred embodiments of the present invention will now be described in detail in accordance with the accompanying drawings.

Hereinafter, referring to drawings, embodiments for implementing the present invention will be described in detail in an exemplary manner. Note that the dimensions, materials and relative arrangements of configurational components described in the embodiments should be appropriately changed according to the configuration of an apparatus to which the present invention is applied and various conditions. The description has no intention to limit the scope of the present invention to the following embodiments.

The present invention relates to an image forming apparatus, and particularly to an electrophotography type image forming apparatus (particularly, a laser printer) that adopts light oscillated by a semiconductor laser as a light source for image exposures, and detects startup of a polygon mirror at the period of a horizontal synchronization signal of a laser beam. More specifically, the present invention relates to an image forming apparatus that emits laser beams corresponding to photosensitive members (photosensitive drums), which are a plurality of image bearing members.

Embodiment 1

An image forming apparatus of Embodiment 1 will hereinafter be described.

(Image Forming Apparatus)

Figure 1:
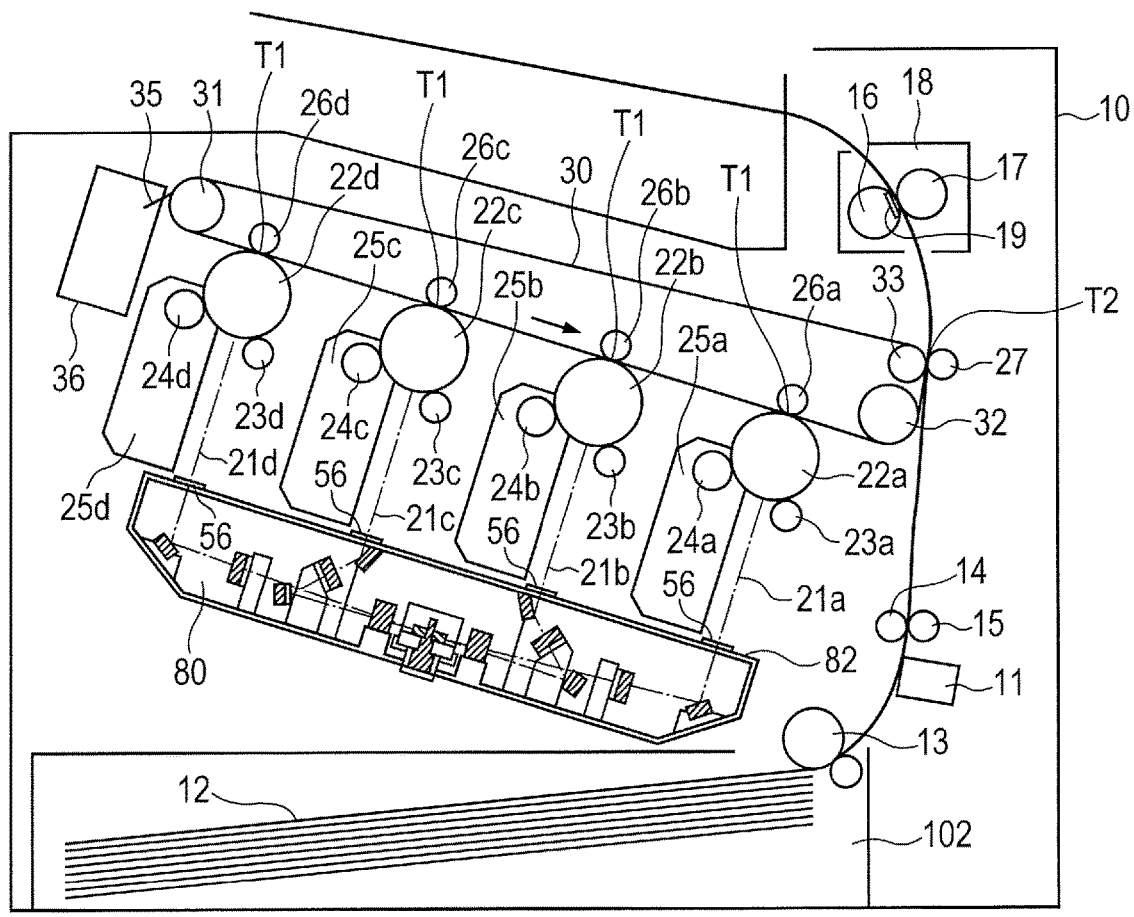
FIG. 1 is a sectional view illustrating a schematic configuration of an image forming apparatus.

FIG. 1 is a sectional view illustrating a schematic configuration of the image forming apparatus 10 of this embodiment. In this embodiment, description will be made exemplifying a four-drum color image forming apparatus as the image forming apparatus 10.

Image forming processing of forming an image on a recording material executed by the image forming apparatus 10 of this embodiment will now be described.

The tip end of the recording material 12 picked up by a pick-up roller 13 is detected by a registration sensor 11. Subsequently, at a position where the tip end passes a little beyond a pair of conveyance rollers 14 and 15, conveyance processing is temporarily stopped.

Meanwhile, a scanner unit 80, which is disposed below photosensitive members 22a to 22d (22a, 22b, 22c and 22d), sequentially emits laser beams (light fluxes) 21a to 21d into the rotatably driven photosensitive members 22a to 22d. At this time, the photosensitive members 22a to 22d are preliminarily charged by charge rollers 23a to 23d. Accordingly, emission with the laser beams 21a to 21d forms electrostatic latent images on the surfaces of the respective photosensitive member. Developers 25a to 25d and developing sleeves 24a to 24d, which are developing units, develop the electrostatic latent images using toner (developing agent) in an order of the photosensitive members 22d, 22c, 22b and 22a to form toner images (developing agent images) on the respective photosensitive members.

To suppress wearing of the developing sleeves 24a to 24d arranged at the developers 25a to 25d, (contactable and separable) mechanisms that can cause the developing sleeves 24a to 24d to contact with and separate from the photosensitive members 22a to 22d are provided. Positions where the developing sleeves 24a to 24d are in contact with the photosensitive members 22a to 22d are developing positions. Positions of separating from the photosensitive members 22a to 22d are retracted positions of being retracted from the developing positions.

The toner images formed on the photosensitive members 22a to 22d are sequentially transferred to an intermediate transfer belt 30, which is an intermediate transfer medium, in an overlapping manner at primary transfer nips T1 formed by developing primary transfer rollers 26a to 26d and the photosensitive members 22a to 22d. The intermediate transfer belt 30 is rotatably driven by rollers 31, 32 and 33, and conveys the toner images to a secondary transfer nip T2 formed at a secondary transfer roller 27. At this time, the recording material 12 is restarted to be conveyed such that the timing is synchronized with the toner images conveyed by the intermediate transfer belt 30 at the secondary transfer nip T2 between the secondary transfer roller 27 and the intermediate transfer belt 30. At the secondary transfer nip T2, the secondary transfer roller 27 transfers the toner images from the intermediate transfer belt 30 to the recording material 12.

Subsequently, an unfixed toner image on the recording material 12 is heated and fixed onto the recording material 12 by a pair of fixing rollers 16 and 17 in a fixing unit 18. The recording material 12, onto which the toner image has been heated and fixed, is ejected (discharged) out of the apparatus. Here, toner having not transferred from the intermediate transfer belt 30 to the recording material 12 by the secondary transfer roller 27 is collected by a cleaning blade 35 into a waste toner bin 36.

(Scanner Unit Configuration of Embodiment 1)

Figure 2:
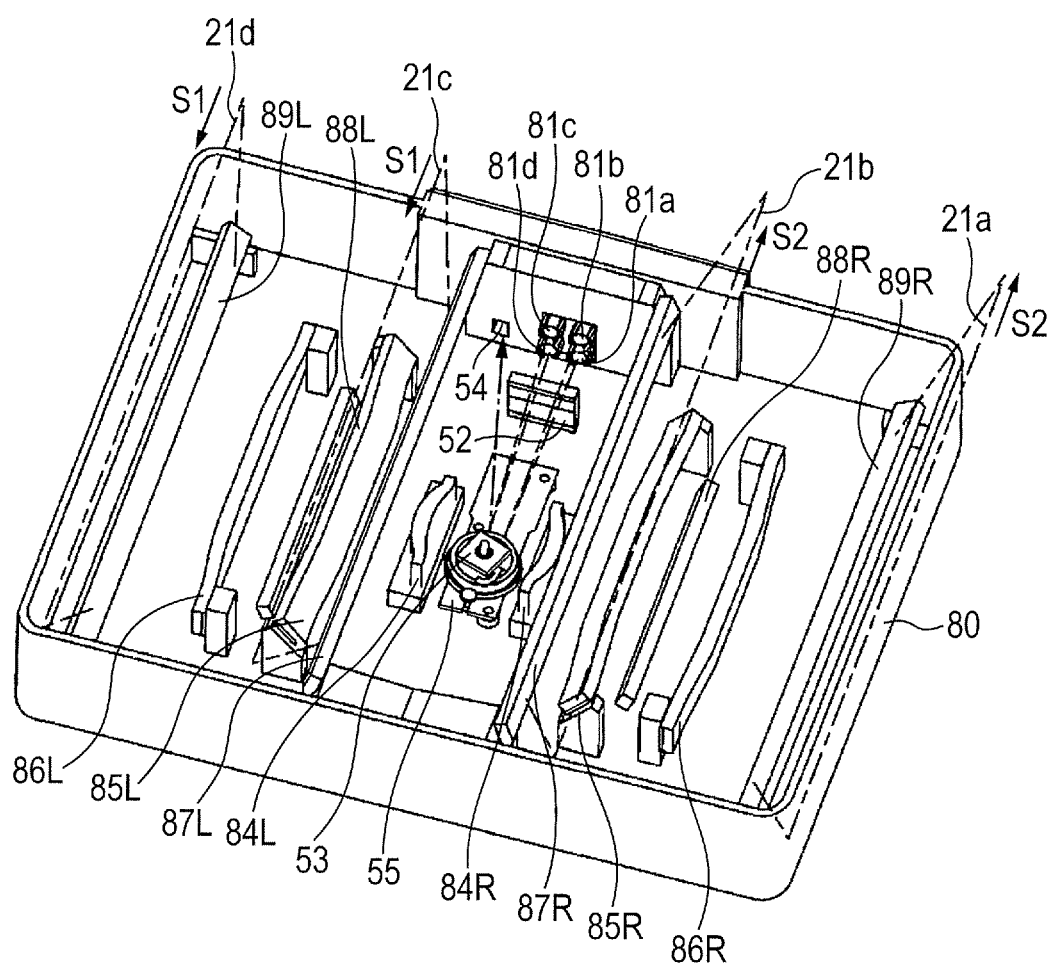
FIG. 2 is a perspective view illustrating an internal schematic configuration of a scanner unit.

Next, referring to FIG. 2, the configuration of the scanner unit (emission unit, optical scanning unit) in the image forming apparatus 10 of this embodiment will be described. FIG. 2 is a perspective view illustrating an internal schematic configuration of the scanner unit 80. For convenience of illustration, FIG. 2 illustrates a state where a cover 82 is removed that is to substantially seal the inside of the scanner unit 80 and includes a glass plate 56 allowing light fluxes to pass therethrough.

As illustrated in FIG. 2, in the scanner unit 80, laser light source devices 81a to 81d, which are horizontally two and vertically two, i.e. four, light sources, are two-dimensionally arranged. A polygon mirror 53 is emitted with laser beams having been emitted from the laser light source devices 81a to 81d. This polygon mirror is a deflector having a deflection reflection surface in proximity to line images of light fluxes formed by being condensed by an integrally formed cylindrical lens 52. The scanner unit 80 includes a scanner motor 55 that is a drive unit for rotatably driving the polygon mirror 53. The scanner motor 55 rotatably drives the polygon mirror 53 to allow the laser beams emitted from the laser light source devices 81a to 81d to be reflected by the deflection reflection surface (identical reflection surface) of the polygon mirror 53, thereby deflecting and scanning the beams.

The scanner unit 80 includes lenses 84L, 84R, 85L, 85R, 86L and 86R and mirrors 87L, 87R, 88L, 88R, 89L and 89R, which are arranged in a substantially bilaterally symmetrical manner centered at the polygon mirror 53 in FIG. 2.

In FIG. 2, the laser beams 21a to 21d deflected by the polygon mirror 53 rotating in a counterclockwise (CCW) direction at a high velocity is imaged on the respective photosensitive members, and scanned in the following manner. The laser beams 21c and 21d emitted from the two laser light source devices 81c and 81d arranged on the left side of FIG. 2 are scanned in the direction of an arrow S1 on the photosensitive members 22c and 22d, respectively. Meanwhile, the laser beams 21a and 21b emitted from the two laser light source devices 81a and 81b arranged on the right side in FIG. 2 are scanned in the direction of an arrow S2 on the photosensitive members 22a and 22b, respectively. Accordingly, the laser beams 21c and 21d are scanned in the direction opposite to the direction in which the laser beams 21a and 21b are scanned (image-formed). A part of the laser beam emitted from the laser light source device 81c is deflected by the polygon mirror 53 and then emitted to the horizontal synchronization detector 54 to generate a horizontal synchronization signal.

Here, the horizontal synchronization detector 54 corresponds to a first horizontal synchronization signal output unit that detects a laser beam emitted to the photosensitive member 22c, and outputs a horizontal synchronization signal, which is a reference of timing when formation of an electrostatic latent image on the photosensitive member 22c is started. The photosensitive member 22d corresponds to a first image bearing member on which the toner image first transferred to the intermediate transfer belt 30 among sequential overlapping of the toner images on the respective photosensitive members (on image bearing members) is formed. The photosensitive member on which the toner image to be first transferred to the intermediate transfer belt 30 in the case where the toner images are overlapped on the respective photosensitive members is the photosensitive member on which first formation of the electrostatic latent image is start after reception of a printing request (image forming request, printing request). The photosensitive member 22c corresponds to any one second image bearing member among the photosensitive members other than the photosensitive member 22d.

One of the photosensitive members 22, the developing sleeve 24 corresponding thereto and the laser light source device 81 correspond to one image forming device (station).

(Description of Timing Up to Printing Start)

A printing (image forming processing) sequence after reception of a printing request will hereinafter be described.

Figure 3:
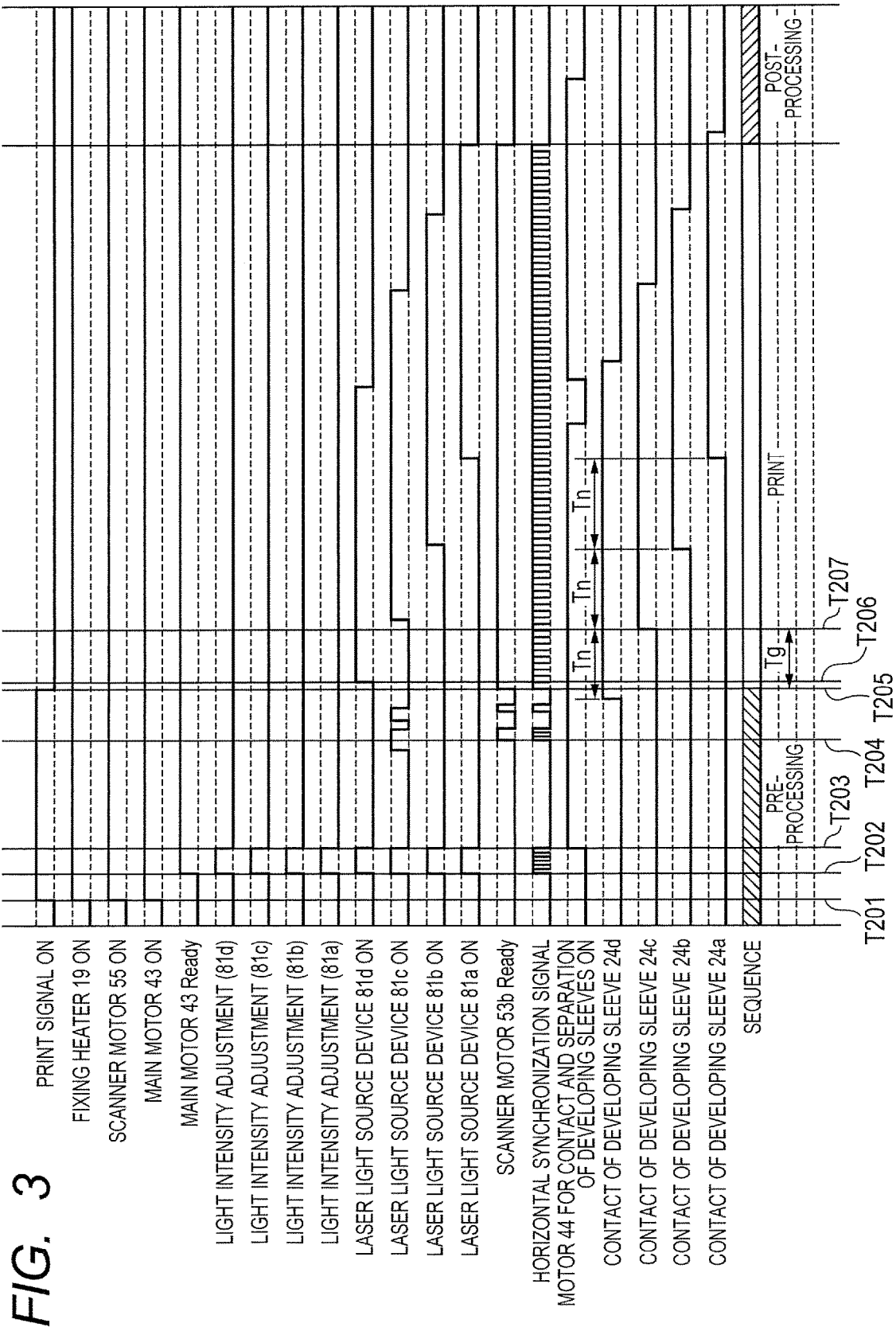
FIG. 3 is a diagram illustrating timing of a printing sequence on and after a printing request.
Figure 4:
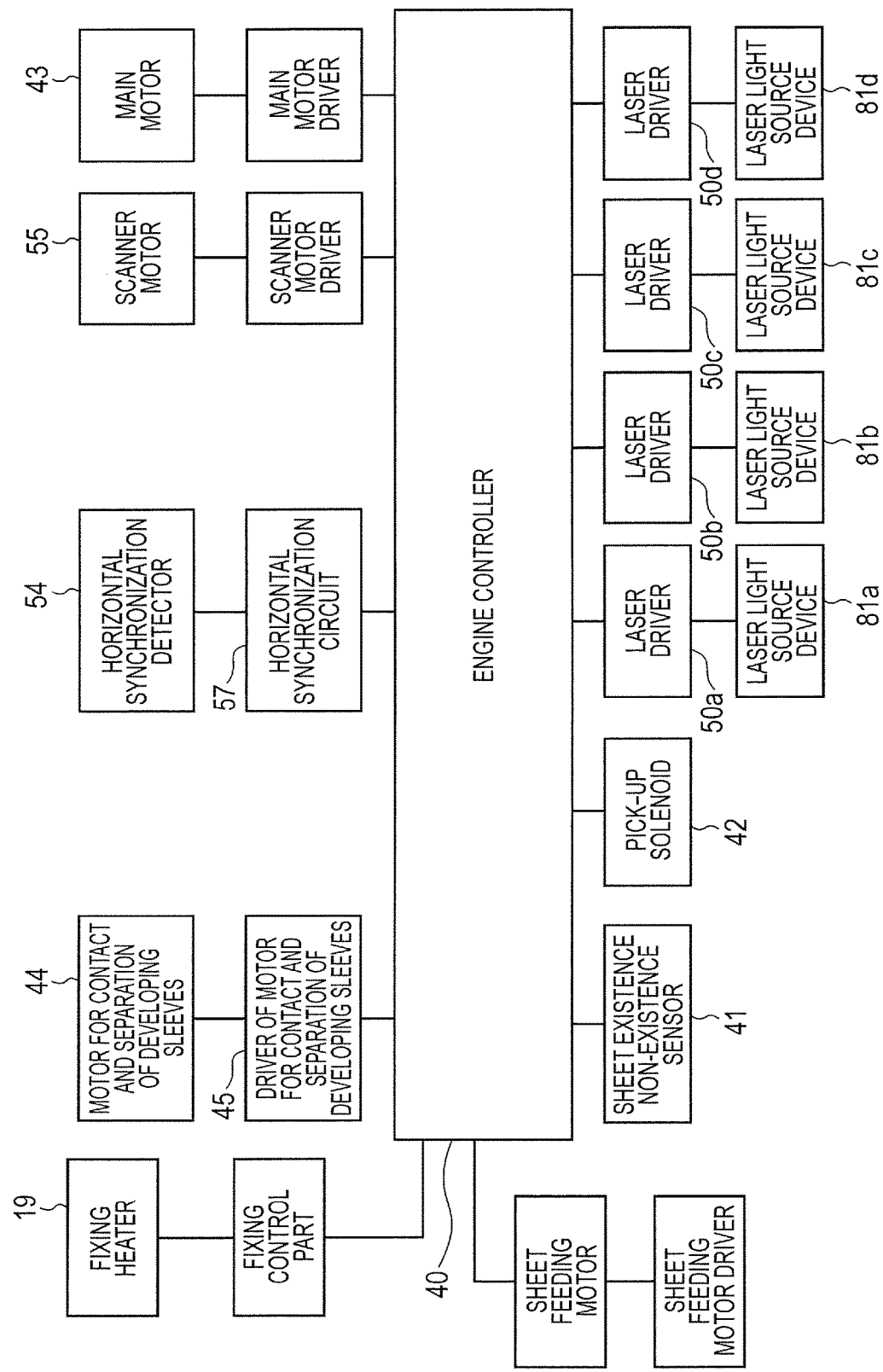
FIG. 4 is a block diagram of an electric circuit applied in control.

FIG. 3 is a diagram for illustrating timing of the printing sequence that is executed on and after a printing request by an engine controller 40 in the image forming apparatus 10 in this embodiment. FIG. 4 is a block diagram of an electric circuit applied for the printing sequence on and after a printing request in the image forming apparatus 10 of this embodiment. Here, in a state before printing is started, the developing sleeves 24a to 24d are separated (retracted) from photosensitive members 22a to 22d, respectively.

When the engine controller 40 determines that a print signal is turned ON, this controller starts control of the fixing heater 19 such that the temperature of the fixing unit 18 becomes a fixable temperature. The ON signal for the scanner motor 55 is set to true for starting rotational control of the scanner motor 55, which rotatably drives the polygon mirror 53, and the ON signal for a main motor 43 is set to true for starting up the main motor 43 of the photosensitive members 22a to 22d (T201). After it is detected that the main motor 43 reaches a prescribed (preset, predetermined) rotation number and comes into a stable state, the laser light source devices 81a to 81d are turned on (ON), laser drivers 50a to 50d as light intensity adjustment devices are controlled such that the laser beam intensities of the laser light source devices 81a to 81d are prescribed light intensities, thereby adjusting light intensity (T202).

After the laser beam intensities of the laser light source devices 81a to 81d are controlled and it is confirmed that the intensities become the prescribed light intensities, an ON signal of a motor 44 for contact and separation of developing sleeves is set to true (T203). Accordingly, developing sleeves 24a to 24d come into contact with the respective photosensitive members 22a to 22d in an order of 24d, 24c, 24b and 24a (reach developing positions). That is, processing of movement to the developing positions for contact with the corresponding photosensitive members is started sequentially from the developing sleeve 24d; it is determined that the recording material 12 exists in the feeding cassette 102 and is ready to be fed, according to a signal of a recording material existence non-existence sensor 41 (FIG. 4), a pick-up solenoid 42 (FIG. 4) is turned ON, and the recording material 12 is fed (T203).

The developing sleeves 24a to 24d are controlled to be contact with the photosensitive members 22a to 22d immediately before the electrostatic latent images are formed thereon for extending life. Thus, consideration is paid to reduce the amount of wearing as much as possible. Accordingly, contact with the photosensitive member is performed in an order of developing sleeves 24d, 24c, 24b and 24a in a manner where a time Tn in which the intermediate transfer belt 30 moves between the photosensitive members is shifted.

A prescribed time after the ON signal of the scanner motor 55, the engine controller 40 performs adjustment processing of adjusting the rotation velocity of the scanner motor 55 to a specified rotation number, which is a rotation velocity for executing image forming processing. That is, it is determined whether the scanner motor 55 securely reaches the specified rotation number or not. In other words, the laser light source device 81c is forcibly emitted (turned on), and the period of the horizontal synchronization signal detected by the horizontal synchronization detector 54 is determined by the horizontal synchronization circuit 57 (T204).

Here, the engine controller 40, which performs determination on timing of T204, corresponds to a determination unit that calculates a value corresponding to the rotation velocity of the polygon mirror 53 using the horizontal synchronization signal output from the horizontal synchronization detector 54 and determines whether the rotation number (rotation velocity) of the polygon mirror 53 reaches the predetermined rotation number (rotation velocity) or not. The lower the rotation velocity of the polygon mirror 53, the longer the period of the horizontal synchronization signal becomes. Thus, on forcible emission, the laser light source device 81c continuously emits light (ON) to allow the horizontal synchronization detector 54 to detect a plurality of horizontal synchronization signals and calculate the value corresponding to the rotation velocity of the polygon mirror 53. As described above, the forcible emission for detecting the rotation velocity of the polygon mirror 53 is emission in a state where the rotation velocity of the polygon mirror and the direction of the reflection surface are unknown. Accordingly, the time period of forcible emission (ON) at least includes a time period in which the photosensitive member 22c is emitted with the light beam from the laser light source device 81c. However, as illustrated in FIG. 3, in this time period, the developing sleeve 24c is not in contact with the photosensitive member 22c. Accordingly, toner does not adhere to the photosensitive member 22c even if the photosensitive member 22c is emitted with the light beam from the laser light source device 81c. Thus, it is a matter of course that toner is not transferred to the intermediate transfer belt 30 and does not adhere to the secondary transfer roller 27. On emission of the laser light source device 81c for detecting whether the scanner motor 55 securely reaches the specified rotation number, the horizontal synchronization signal may be detected in a state where the laser beam intensity is reduced to an extent capable of detecting the horizontal synchronization signal until detection of whether the period of the horizontal synchronization signal has abnormality or not. Accordingly, degradation due to emission on the surface of the photosensitive member with light can be reduced.

In the case where the period of the horizontal synchronization signal is not a prescribed period (does not reach a specified rotation number), the scanner motor 55 is accelerated or decelerated to adjust the rotation velocity. When it is verified that the period of the horizontal synchronization signal becomes the prescribed period (reaches the specified rotation number), the adjustment processing is finished. It is determined that the fixing unit 18 reaches a prescribed fixable temperature (T205).

As illustrated in FIG. 3, before timing when the adjustment processing is completed (T205), the developing sleeve 24d is in contact with the photosensitive member 22d (reaches the developing position). However, during the adjustment processing, the laser light source device 81d is turned off (not ON). Accordingly, even when the developing sleeve 24d is in contact with the photosensitive member 22d, an amount of toner that will make the recording material dirty does not adhere.

In this embodiment, the horizontal synchronization detector 54 is arranged in the station (image forming unit) including the photosensitive member 22c. Thus, forcible emission of the laser light source device 81c allows the horizontal synchronization signal to be detected, and it is verified that the scanner motor 55 reaches the specified rotation number (T205), and subsequently, the time (interval) Tg until the developing sleeve 24c comes into contact with the photosensitive member 22c (T207) can be sufficiently secured. That is, during forcible emission of the laser light source device 81c, the developing sleeve 24c can be separated from the photosensitive member 22c.

Here, the horizontal synchronization detector 54 may be arranged in the station (photosensitive members 22b and 22a) downstream of the station of the photosensitive member 22c. This arrangement allows the time Tg to be longer.

It is verified that the determination on T205 is performed within a prescribed time from the printing request, and subsequently, the horizontal synchronization signal in the station where the horizontal synchronization detector 54 is not provided is generated by the engine controller 40. The engine controller 40 masks a video signal such that laser light source devices 81a to 81d do not emit light in areas other than the area where an image can be formed on the recording material 12 and timing other than that of detecting a laser beam by the horizontal synchronization detector 54. According to the video signal after masking, the laser beams are modulated in the laser light source devices 81a to 81d, and sequential exposures from the laser light source device 81d are performed (T206).

The image forming processing is thus started (executed). Here, the engine controller 40, which performs control of starting exposures on timing T206, corresponds to an executing unit that executes image forming processing when it is determined that the rotation number of the polygon mirror 53 reaches the predetermined rotation number. Thus, the timing from reception of the print signal by the image forming apparatus to start of exposures by the scanner unit has been described.

As described above, in this embodiment, the scanner motor 55 determines whether the specified rotation number is securely reached, using the horizontal synchronization signal, which is output by detecting the laser beam for emission on the photosensitive member 22c other than the photosensitive member 22d on which formation of the first electrostatic latent image is started. Thus, after the developing sleeve 24d starts contact processing (movement to the developing position) to the photosensitive member 22d where the first electrostatic latent image is to be formed (T203), the photosensitive member 22d is prevented from being exposed to the laser beam. Accordingly, before the adjustment processing by the scanner motor 55 for forcible emission of the laser light source device 81c is finished, movement of the developing sleeve 24d to the developing position can be started. That is, in comparison with the configuration that performs the adjustment processing of the scanner motor 55 with forcible emission of the laser light source device 81d, the start timing of movement of the developing sleeve 24d to the developing position can be advanced.

Accordingly, unnecessary toner is prevented from being developed onto the photosensitive member 22d, which in turn prevents the toner on the photosensitive member 22d from making the secondary transfer roller 27 dirty via the intermediate transfer belt 30. That is, the undersurface of the recording material 12 is prevented from being made dirty. Furthermore, inconsistencies in densities on the exposed part can be prevented from occurring. The inconsistencies are feared when the photosensitive member is emitted with the laser beam. Moreover, a horizontal line on the photosensitive member is prevented from being generated. The horizontal line is caused by the entire emission with the laser beam for detecting the horizontal synchronization signal during startup of the scanner motor.

In this embodiment, startup control of the scanner motor 55 is performed in the station of the photosensitive member 22c. The time Tg from the scanner motor 55 reaching the specified rotation number to the developing sleeve 24c coming into contact with the photosensitive member 22c can sufficiently be secured. The problem feared owing to emission of the photosensitive member 22c with the laser beam can be prevented from occurring using the time Tg (within the time Tg).

Thus, in this embodiment, the startup control (adjustment processing) of the scanner motor 55 is performed in the station (second image forming device) of the photosensitive member 22c where the image forming processing is performed after that in the station (first image forming device) of the photosensitive member 22d for performing the image forming processing. Accordingly, movement to the developing position of the developing sleeve 24d can be started before adjustment processing of the scanner motor 55 forcibly causing the laser light source device 81c to perform emission is finished. Thus, immediately after the scanner motor 55 reaches the specified rotation number (after the adjustment processing of the scanner motor 55 is finished), the image forming processing on the photosensitive member 22d can be started.

Thus, according to this embodiment, in comparison with the case where the startup control of the scanner motor 55 is performed in the station of the photosensitive member 22d, timing when movement of the developing sleeve 24d to the developing position can be advanced without addition of new components. Accordingly, the first print out time can be reduced.

In this embodiment, from T203 to T206, the laser light source device 81d is turned off (not ON). However, the scope is not limited thereto. That is, the photosensitive member 22d may be emitted with a very small light intensity according to which the surface potential of the photosensitive member 22d becomes a surface potential that does not allow toner to adhere even if the developing sleeve 24d is in contact with the photosensitive member 22d.

In this embodiment, the intermediate transfer image forming apparatus using the intermediate transfer belt 30 in the transfer step has been described. However, the scope is not limited thereto. That is, the present invention can appropriately be applied to an image forming apparatus adopting a scheme of transferring a toner image to a recording material carried and conveyed on the conveyance belt.

Embodiment 2

An image forming apparatus of Embodiment 2 will hereinafter be described. Configurational components analogous to those of Embodiment 1 are assigned with the identical symbols. The description thereof is omitted.

Figure 5:
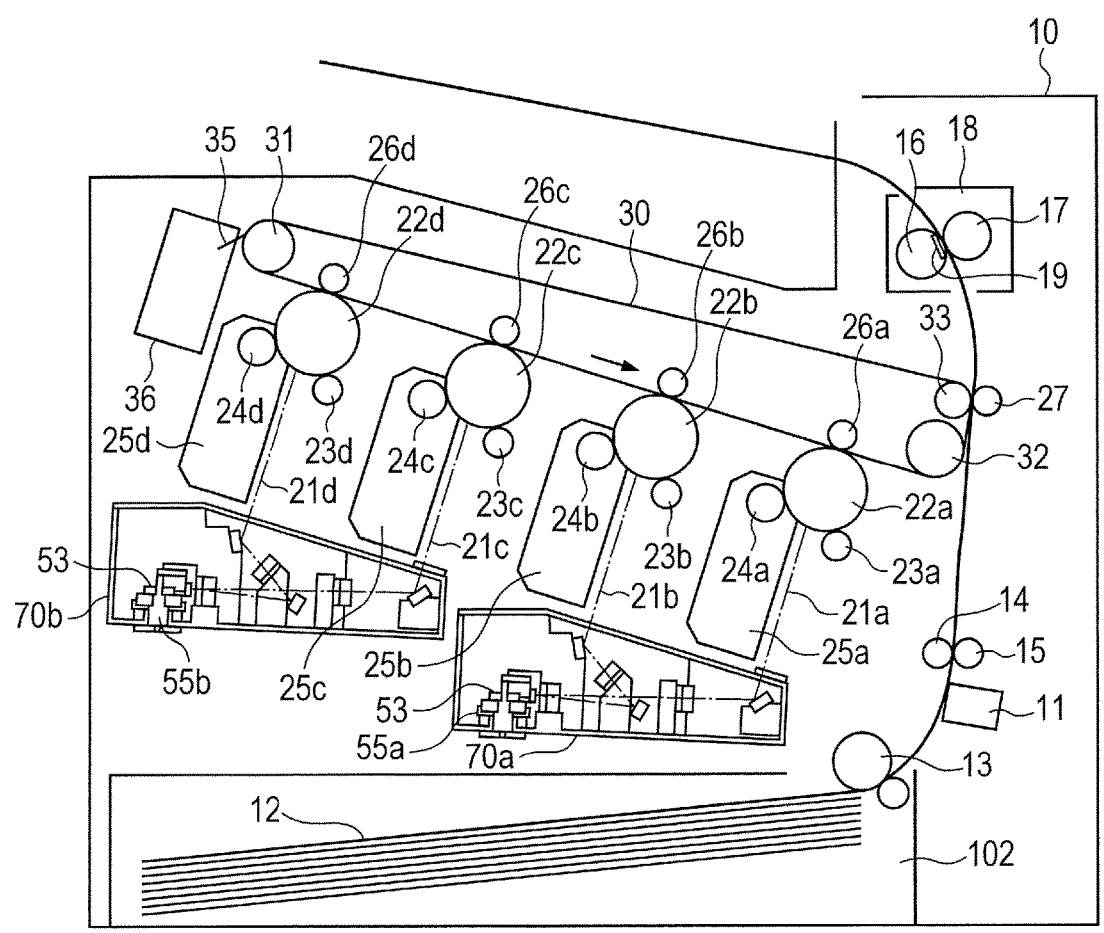
FIG. 5 is a sectional view illustrating a schematic configuration of an image forming apparatus.

FIG. 5 is a sectional view illustrating a schematic configuration of the image forming apparatus of this embodiment. As illustrated in FIG. 5, this embodiment includes a first scanner unit 70a and a second scanner unit 70b. In this point, this embodiment is different from Embodiment 1. Here, the first and second scanner units 70a and 70b have configurations identical to each other. According to image signals separated for two colors, the first and second scanner units 70a and 70b emits laser beams from one polygon mirror into the corresponding photosensitive members with to form a full-color image.

(Scanner Unit Configuration of Embodiment 2)

Figure 6:
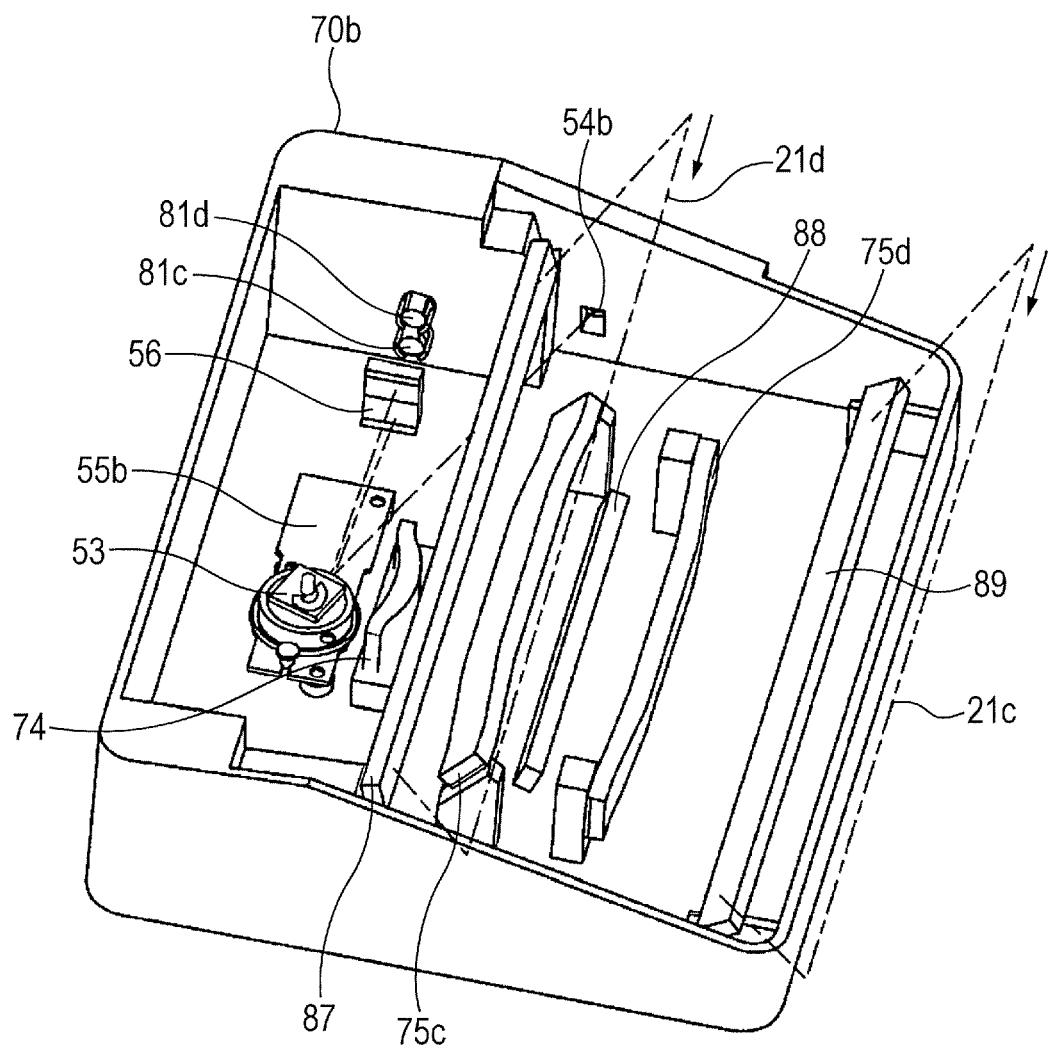
FIG. 6 is a perspective view illustrating an internal schematic configuration of a scanner unit.

FIG. 6 is a diagram for illustrating an internal schematic configuration of the second scanner unit 70b in this embodiment. Here, the second scanner unit 70b between the first and second scanner units 70a and 70b will be described. However, the first scanner unit 70a has the same configuration. For convenience of illustration, FIG. 6 illustrates a state where a cover is removed that is to substantially seal the inside of the second scanner unit 70b and includes a glass plate allowing light fluxes to pass therethrough.

Laser beams emitted from the laser light source devices 81d and 81c (laser light source devices 81b and 81a in the first scanner unit 70a) arranged vertically in the diagram pass through the cylindrical lens 52 and are subsequently condensed on the identical reflection surface of the polygon mirror 53. The polygon mirror 53 is rotatably driven by the scanner motor 55b at a high velocity to deflect incident laser beams in the identical direction. The deflected beams pass through lenses 74, 75c and 75d and are reflected by mirrors 87, 88 and 89, and condensed and scanned on the photosensitive members 22c and 22d to form electrostatic latent images.

In the diagram, a light receiving element 54b configures the horizontal synchronization detector, and is arranged at a position capable of detecting the laser beam from the laser light source device 81c between two lasers that performs the exposure of the photosensitive member 22c. The horizontal synchronization signal acquired from the light receiving element is transmitted to a laser driver substrate, not illustrated, thereby allowing modulation timing of the laser light source devices 81d and 81c to be determined and enabling an image to be formed on a desired position on the photosensitive member.

For convenience of illustration, a horizontal synchronization detector 54a is included in the first scanner unit 70a. A part of laser beam 21a emitted from the laser light source device 81a is used for detection.

(Description of Timing Up to Printing Start)

A printing sequence after reception of a printing request will hereinafter be described.

Figure 7:
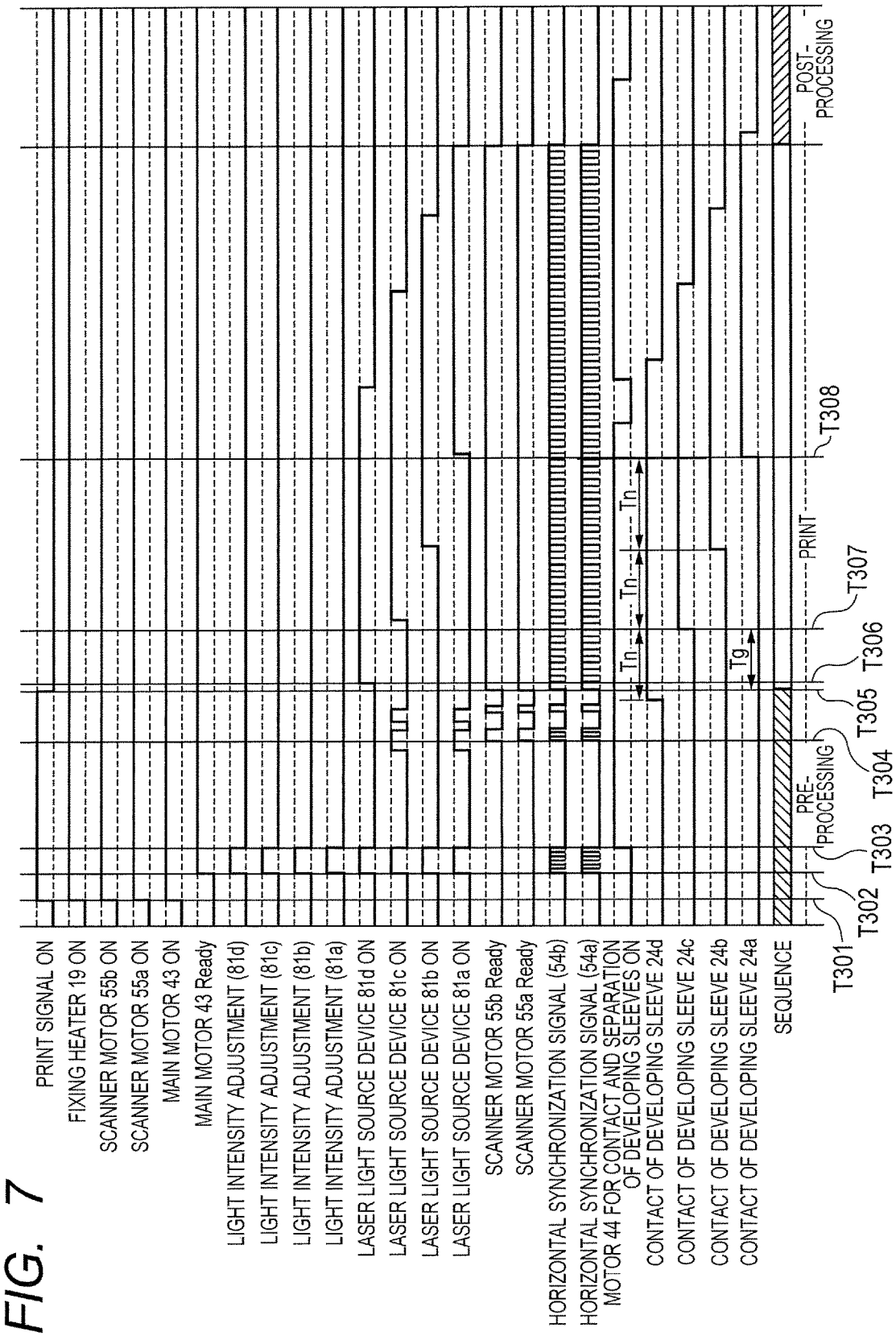
FIG. 7 is a diagram illustrating timing of a printing sequence on and after a printing request.
Figure 8:
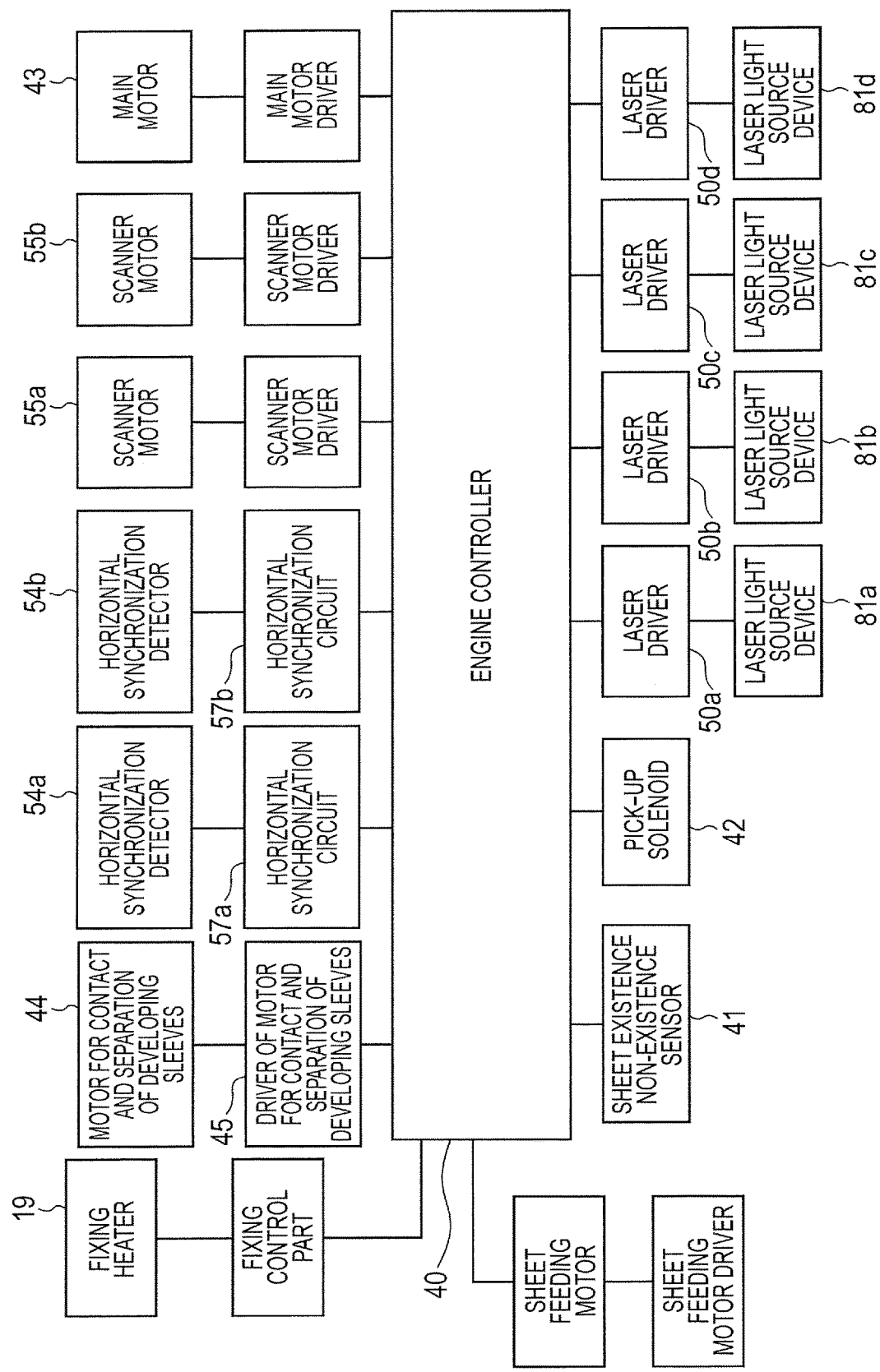
FIG. 8 is a block diagram of an electric circuit applied in control.

FIG. 7 is a diagram for illustrating timing of a printing sequence on and after a printing request that is executed by the engine controller 40 in the image forming apparatus of this embodiment. FIG. 8 is a block diagram of an electric circuit applied in a printing sequence on and after a printing request in the image forming apparatus of this embodiment.

The engine controller 40 having determined that the print signal is turned ON starts control of the fixing heater 19 such that the temperature of the fixing unit 18 becomes the fixable temperature. ON signals of the scanner motors 55b and 55a are set to true for starting rotation control of the scanner motors 55b and 55a, which are drive units rotatably driving the polygon mirror 53. Furthermore, the ON signal of the main motor 43 is set to true for starting up the main motor 43 of the photosensitive members 22a to 22d (T301).

When it is detected that the main motor 43 reaches a prescribed rotation number and comes into a stable state, the laser drivers 50a to 50d as the light intensity adjustment devices are controlled to adjust the light intensities by controlling the laser beam intensities from the laser light source devices 81a to 81d to become prescribed light intensities (T302).

When it is verified that the laser beam intensities of the laser light source devices 81a to 81d are controlled to become prescribed light intensities, the ON signal of the motor 44 for contact and separation of developing sleeves is set to true (T303). Accordingly, the developing sleeves 24a to 24d sequentially come into contact with the photosensitive members 22a to 22d according to an order of the sleeves 24d, 24c, 24b and 24a. It is determined that the recording material 12 exists in the feeding cassette 102 and is ready to be fed, according to a signal of the recording material existence non-existence sensor 41 (FIG. 8), the pick-up solenoid 42 (FIG. 8) is turned ON, and the recording material 12 is fed (T303).

The developing sleeves 24a to 24d are controlled to be contact with the photosensitive members 22a to 22d immediately before the electrostatic latent image are formed thereon for extending life. Thus, consideration is paid to reduce the amount of wearing as much as possible. Accordingly, contact with the photosensitive member is performed sequentially from the developing sleeve 24d in a manner where a time Tn in which the intermediate transfer belt 30 moves between the photosensitive members is shifted.

A prescribed time after ON signals of the scanner motors 55b and 55a, following determination is performed to detect whether the scanner motors 55b and 55a securely reach a specified rotation number or not. That is, the laser light source devices 81c and 81a are turned on, and the periods of the horizontal synchronization signals detected by the horizontal synchronization detectors 54b and 54a are determined by the horizontal synchronization circuits 57b and 57a, respectively (T304).

After it is verified that the period of the horizontal synchronization signal does not have abnormality, it is determined that the fixing unit 18 reaches the prescribed fixable temperature (T305).

After it is verified that the determination in T305 is performed within a prescribed time after a printing request, horizontal synchronization signals in stations that are not provided with the horizontal synchronization detectors 54b and 54a are generated by the engine controller 40. The engine controller 40 masks a video signal such that the laser light source devices 81a to 81d do not emit light in areas other than the area where an image can be formed on the recording material 12 and timing other than that of detecting laser beams by the horizontal synchronization detectors 54b and 54a. According to the video signal after masking, the laser beam is modulated in the laser light source devices 81a to 81d, and sequential exposures from the laser light source device 81d are performed (T306). Thus, the image forming processing is started (executed).

Thus, the timing from reception of the print signal by the image forming apparatus to start of exposures by the scanner unit has been described.

As described above, this embodiment can also exert advantageous effects analogous to those in Embodiment 1.

In this embodiment, the startup control of the scanner motor is performed also in the station of the photosensitive member 22a. An interval between timing T305 and timing T308 on which the developing sleeve 24a comes into contact with the photosensitive member 22a is longer than the time Tg. Accordingly, in the station of the photosensitive member 22a, the undersurface of the recording material 12 is not made dirty. Here, the time Tg is analogous to that of Embodiment 1, and a time from T305 to a time when the developing sleeve 24c comes into contact with the photosensitive member 22c (T307). Even embodiments as with this embodiment where the plurality of scanner units is included in the image forming apparatus exert advantageous effects analogous to those of Embodiment 1.

Embodiment 3

An image forming apparatus of Embodiment 3 will hereinafter be described. Configurational components analogous to those of Embodiments 1 and 2 are assigned with the identical symbols. The description thereof is omitted.

Figure 9:
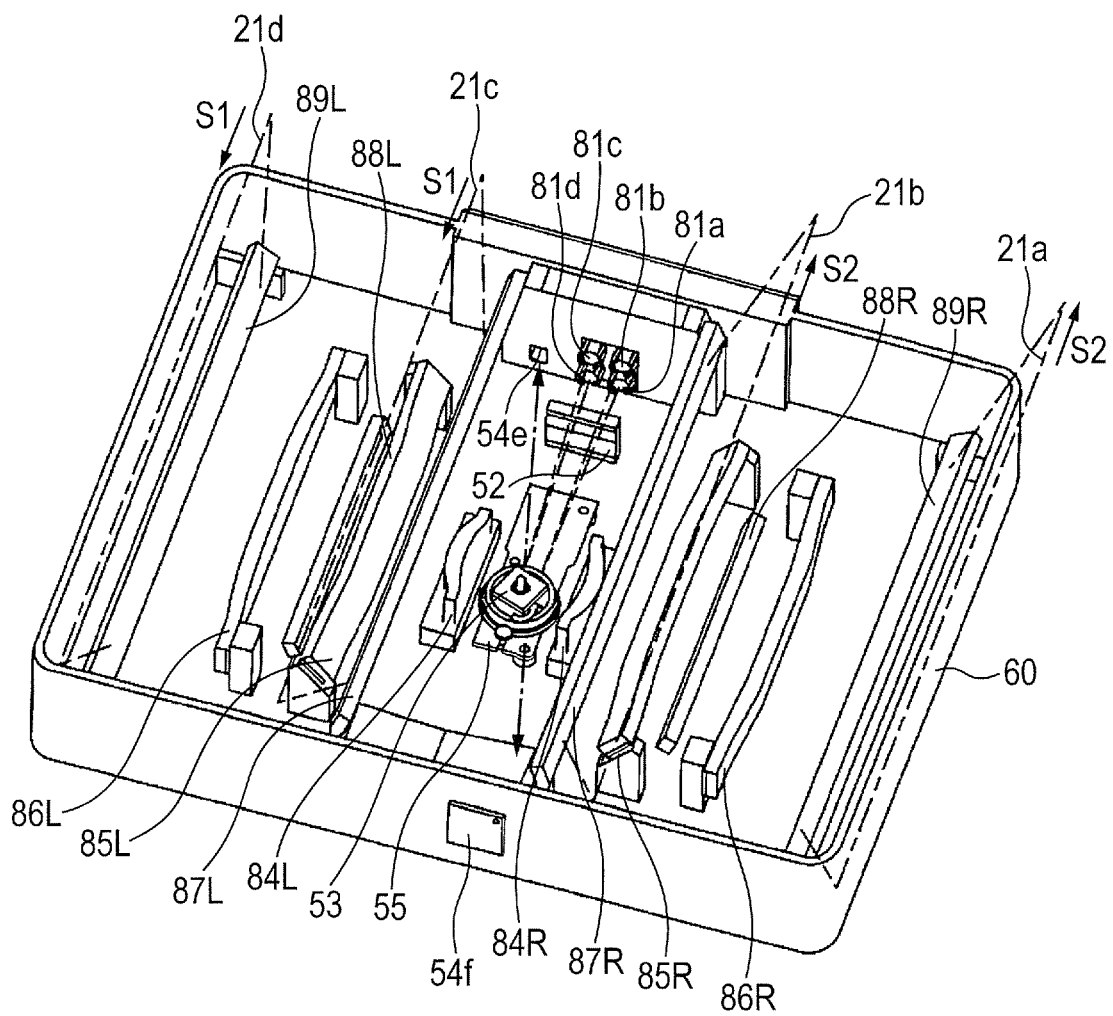
FIG. 9 is a perspective view illustrating an internal schematic configuration of a scanner unit.

FIG. 9 is a perspective view for illustrating the internal schematic configuration of the scanner unit 60 of this embodiment. This embodiment is different, from Embodiment 1, in that the scanner unit 60 as with illustrated in FIG. 9 is mounted and in the method of controlling the scanner unit. Here, for the sake of illustration, FIG. 9 illustrates a state where a cover 82 is removed that is to substantially seal the inside of the scanner unit 60 and includes a glass plate 56 allowing light fluxes to pass therethrough.

(Scanner Unit Configuration of Embodiment 3)

As illustrated in FIG. 9, as with FIG. 2 illustrated in Embodiment 1, the scanner unit 60 includes the laser light source devices 81a to 81d, the cylindrical lens 52, the polygon mirror 53 and the scanner motor 55. In the scanner unit 60, the lenses 84L, 84R, 85L, 85R, 86L and 86R and mirrors 87L, 87R, 88L, 88R, 89L and 89R are included as with FIG. 2.

Here, in the scanner unit 80 of Embodiment 1, one horizontal synchronization detector 54 is arranged. In contrast, in the scanner unit 60 of this embodiment, two horizontal synchronization detectors 54e and 54f are arranged.

The horizontal synchronization detector 54e is arranged at a position capable of detecting a laser beam from the laser light source device 81d to which the photosensitive member 22d is exposed. The horizontal synchronization detector 54f is arranged at a position capable of detecting a laser beam from the laser light source device 81a to which the photosensitive member 22a is exposed. Here, the horizontal synchronization detector 54e corresponds to a second horizontal synchronization signal output unit. The horizontal synchronization detector 54f corresponds to a first horizontal synchronization signal output unit. In this embodiment, the photosensitive member 22a corresponds to a second image bearing member.

The horizontal synchronization signals acquired from the horizontal synchronization detectors 54e and 54f are transmitted to the laser driver substrate, not illustrated, thereby determining modulation timing of the laser light source devices 81a to 81d, and forming an image at a desired position on the photosensitive member.

In this embodiment, the horizontal synchronization units are arranged at the two points. However, the scope is not limited thereto. Only with the horizontal synchronization detector in the station of the photosensitive member 22d where formation of an electrostatic latent image is started first, the horizontal synchronization detector may be provided at least one of the stations.

(Description of Timing Up to Printing Start)

A printing sequence on and after reception of a printing request will hereinafter be described.

Figure 10:
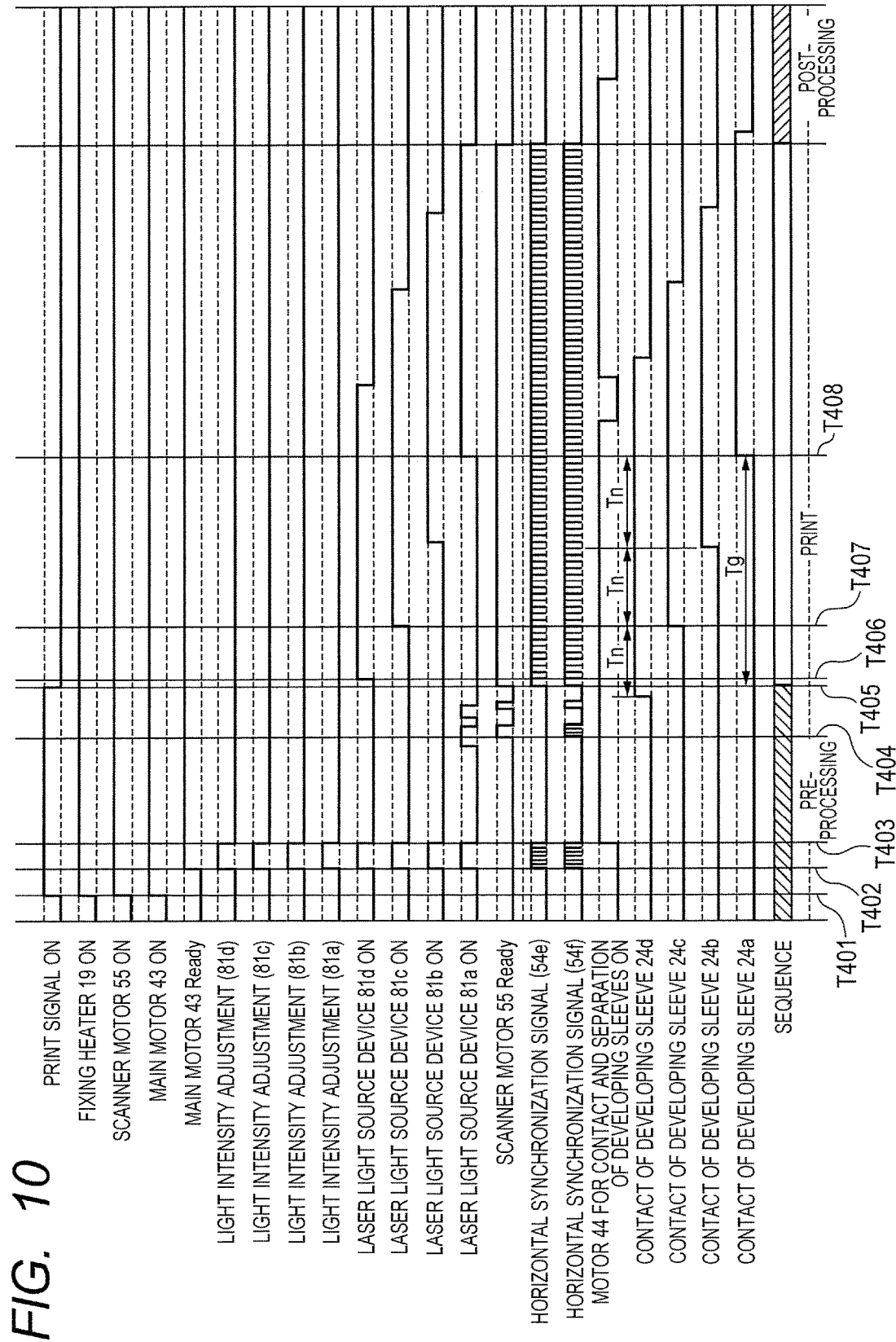
FIG. 10 is a diagram illustrating timing of a printing sequence on and after a printing request.
Figure 11:
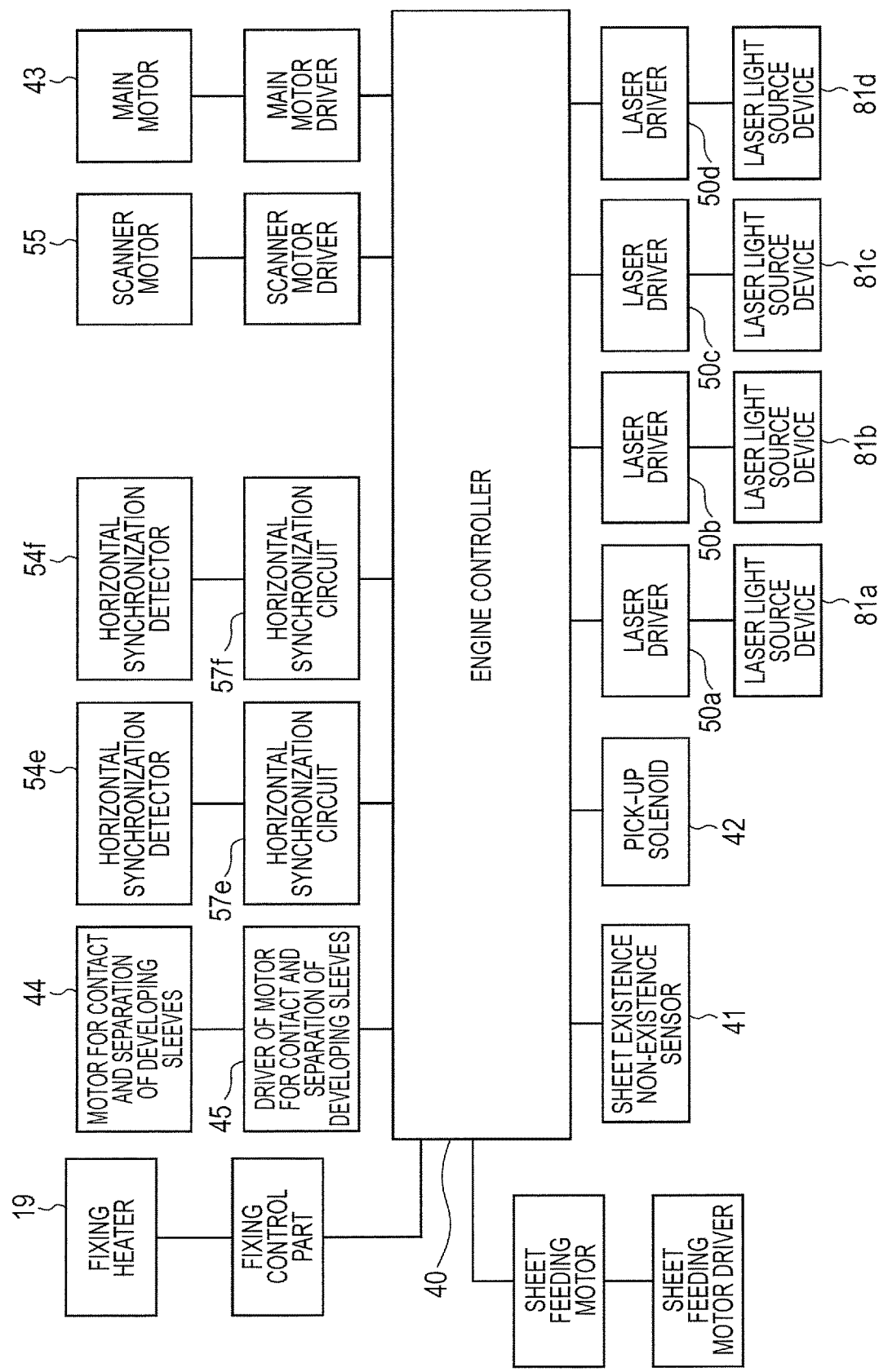
FIG. 11 is a block diagram of an electric circuit applied in control.

FIG. 10 is a diagram for illustrating timing of the printing sequence on and after a printing request that is executed by the engine controller 40 in the image forming apparatus of this embodiment. FIG. 11 is a block diagram of an electric circuit adopting the printing sequence on and after a printing request in the image forming apparatus of this embodiment.

Timing T401 to timing T403 illustrated in FIG. 10 are analogous to timing T201 to timing T203 described using FIG. 3 in Embodiment 1.

In this embodiment, to detect whether the scanner motor 55 securely reaches the specified rotation number a prescribed time after the ON signal of the scanner motor 55, following determination is performed. That is, the laser light source device 81a is turned on, and the period of the horizontal synchronization signal detected by the horizontal synchronization detector 54f is determined in the horizontal synchronization circuit 57f (T404).

It is verified that the period of the horizontal synchronization signal does not have abnormality, and it is determined that the fixing unit 18 reaches the prescribed fixable temperature (T405).

In this embodiment, it is determined that the determination T405 is performed within the prescribed time after the printing request. Subsequently, a unit that detects the laser beam 21d to which the photosensitive member 22d is exposed and outputs the horizontal synchronization signal is switched from the horizontal synchronization detector 54f to the horizontal synchronization detector 54e. The engine controller 40 masks a video signal such that the laser light source device 81d does not emit the light beam in areas other than the area where an image can be formed on the recording material 12 and timing other than that of detecting laser beams by the horizontal synchronization detector 54e. According to the video signal after masking, the laser beam is modulated in the laser light source device 81d, and the exposure is started (T406).

Meanwhile, in the stations of the photosensitive members 22c and 22b, which are not provided with the horizontal synchronization detector, it is verified whether T405 is within a prescribed time, and then the engine controller 40 starts generating the horizontal synchronization signal. Subsequently, the engine controller 40 masks a video signal such that the laser light source devices 81a, 81b and 81c do not emit the light beam in areas other than the area where an image can be formed on the recording material 12 and timing other than that of detecting laser beams by the horizontal synchronization detector 54f. According to the video signal after masking, the laser beams are modulated in the laser light source devices 81a, 81b and 81c, and the exposures are sequentially started in an order of the laser light source devices 81c, 81b and 81a. Here, in this embodiment, the time Tg is a time from T405 until the developing sleeve 24a comes into contact with the photosensitive member 22a (T408). Timing T407 is that when the developing sleeve 24c comes into contact with the photosensitive member 22c.

The timing from the image forming apparatus receiving the print signal to the scanner unit starting the exposure has thus been described.

As described above, this embodiment can also exert advantageous effects analogous to those in Embodiment 1. In addition, this embodiment can exert following advantageous effects. The configuration of Embodiment 1 uses the horizontal synchronization signal generated by the engine controller 40 in the station of the photosensitive member 22d. In contrast, in this embodiment, the photosensitive member 22d, on which an electrostatic latent image is formed first, is provided with the horizontal synchronization detector 54e. When the scanner motor 55 reaches the specified rotation number and the image forming processing is started on the photosensitive member 22d, the output of the horizontal synchronization detector 54e is used as the horizontal synchronization signal for forming the electrostatic latent image on the photosensitive member 22d. This configuration negates the need to wait for generation of the horizontal synchronization signal in the engine controller 40 in the station of the photosensitive member 22d. Accordingly, the first print out time can be reduced in comparison with that in the configuration of Embodiment 1.

Embodiment 4

Embodiment 4 will now be described. The configuration of the image forming apparatus 10 of this embodiment is analogous to that of Embodiment 1. The components are assigned with analogous symbols. The description thereof is omitted.

In this embodiment, monochrome printing of forming a monochrome image only in the station of the photosensitive drum 22a will be described.

Figure 12:
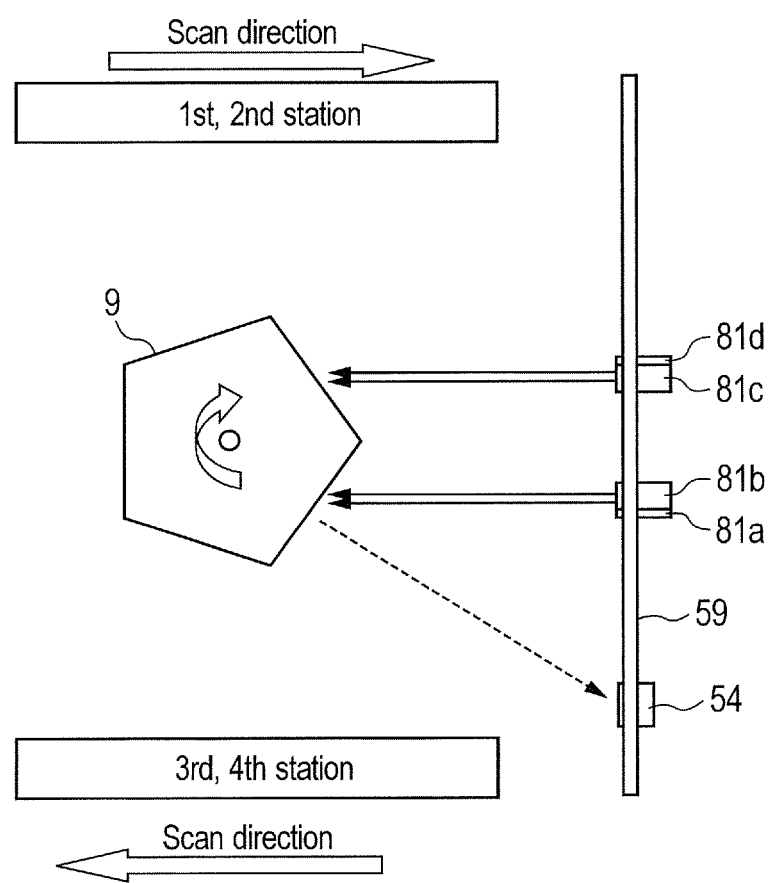
FIG. 12 is a diagram illustrating arrangement of a polygon mirror and a laser substrate in a scanner unit.

FIG. 12 is a diagram illustrating schematic configurations of a polygon mirror 53 and a laser substrate 59 provided in the scanner unit 80 of this embodiment. As with Embodiment 1, in this embodiment, during rotation of the polygon mirror 53, a light beam emitted from the laser light source device 81d and a light beam emitted from the laser light source device 81c are simultaneously scanned on the reflection surface of the identical polygon mirror. Likewise, a light beam emitted from the laser light source device 81b and a light beam emitted from the laser light source device 81a are simultaneously scanned on the reflection surface of the identical polygon mirror. At this time, the reflection surface of the polygon mirror on which the light beam emitted from the laser light source device 81d and the light beam emitted from the laser light source device 81c are simultaneously scanned is different from the reflection surface of the polygon mirror on which the light beam emitted from the laser light source device 81b and the light beam emitted from the laser light source device 81a are simultaneously scanned.

The horizontal synchronization detector 54 as the detector is emitted with the light beam emitted from the laser light source device 81b and deflected and scanned by the polygon mirror 53 or the light beam emitted from the laser light source device 81a and deflected and scanned by the polygon mirror 53. A main scanning reference signal in the station of the photosensitive member 22a is generated from a detection signal (output) of the horizontal synchronization detector 54 that is generated by the emission. Here, in this embodiment, the detection signal of the horizontal synchronization detector 54 is adopted as the horizontal synchronization signal. The horizontal synchronization signal is used as a reference of timing of starting video emission. In the case of monochrome printing processing, the horizontal synchronization signal corresponds to the horizontal synchronization signal used for monochrome printing processing as a reference of timing of starting an electrostatic latent image on the photosensitive drum 1.

Figure 15:
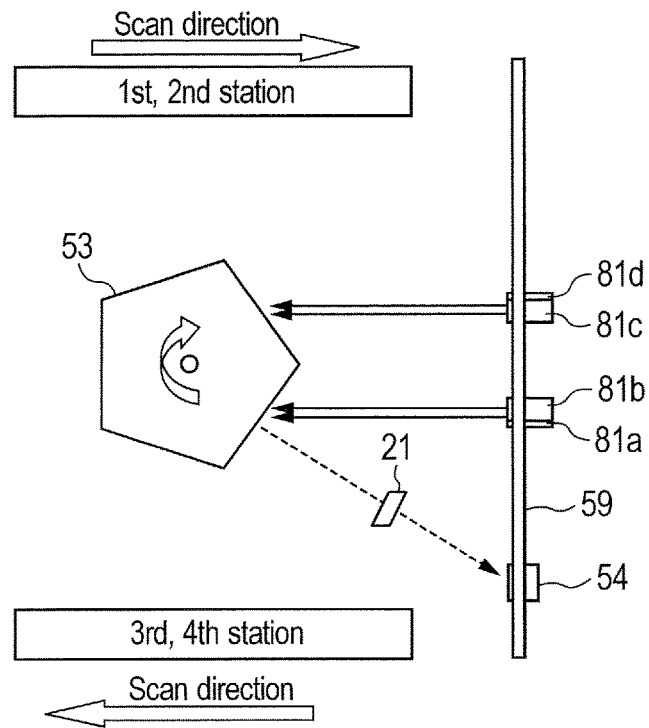
FIG. 15 is a diagram illustrating arrangement of a polygon mirror and a laser substrate in a scanner unit.

FIG. 15 is a diagram illustrating schematic configurations of the polygon mirror 53 and the laser substrate 59 provided in the scanner unit 80 in another mode.

In FIG. 12, no mirror is provided between the horizontal synchronization detector 54 and the polygon mirror 53, and the horizontal synchronization detector 54 is emitted with both light beams from the laser light source devices 81b and 81a. In contrast, as illustrated in FIG. 15, the mirror 58 may be provided between the horizontal synchronization detector 54 and the polygon mirror 53, and the horizontal synchronization detector 54 may be emitted with both the light beams from the laser light source devices 81b and 81a.

Figure 13:
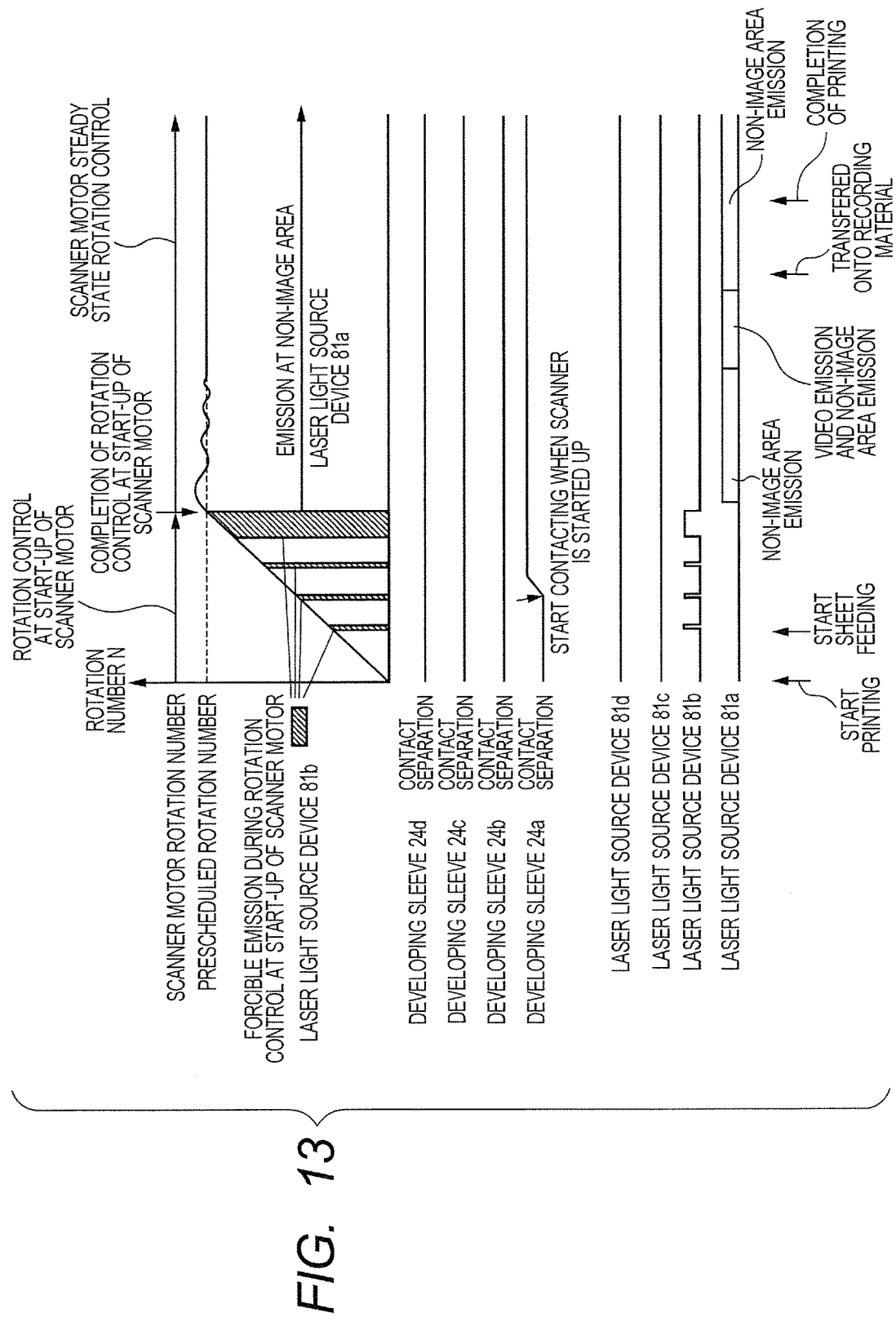
FIG. 13 is a diagram illustrating timing of a printing sequence on and after a printing request.

The characteristics of this embodiment will be described in detail using FIG. 13. FIG. 13 is a timing chart illustrating a printing sequence of this embodiment. The printing sequence of this embodiment is executed by the engine controller 40 that controls printing processing of the image forming apparatus 10. The engine controller 40 is for controlling configurational components configuring the image forming apparatus 10. Here, the engine controller 40 corresponds to the adjustment device.

The ordinate axis of the graph of the upper part of FIG. 13 illustrates the rotation number of the scanner motor, and the abscissa axis illustrates time. The graph illustrates emission timing of the laser light source device 81 in the rotation control at startup of the scanner motor 55. The middle part of FIG. 13 illustrates a state where the developing sleeves 24 contacts with and separates from the respective photosensitive drums 1. The lower part of FIG. 13 illustrates an emission state of each laser light source device 81.

When a printing start instruction (printing request) for monochrome printing is transmitted from an external apparatus, such as a personal computer, to the image forming apparatus 10, the rotation control at startup of the scanner motor 55 is started. In the rotation control at startup, the engine controller 40 operates the scanner motor 55 to rotate the polygon mirror 53, and transmits an acceleration signal to the scanner motor 55 such that the polygon mirror 53 is accelerated and rotated at a prescribed rotation number (rotation velocity, velocity).

Subsequently (after start of rotational processing of the polygon mirror 53), after a prescribed (predetermined) time elapses, the laser light source device 81b in the station that does not form an image is forcibly caused to emit a light beam for a certain time period, the horizontal synchronization detector 54 is used to detect (measure) the rotation number of the polygon mirror 53, and the laser light source device 81b is forcibly caused to be turned off. In execution of the rotation control at startup, the time period during which the laser light source device 81b is forcibly caused to continuously emit light is set to a time period in which the light beam emitted from the laser light source device 81b and reflected by the rotating polygon mirror 53 is incident on the horizontal synchronization detector 54 at a plurality of times. Accordingly, the period of timing when the horizontal synchronization detector 54 detects the light beam from the laser light source device 81b is calculated, thereby allowing the value corresponding to the rotation number of the polygon mirror 53 to be detected. Therefore, during the certain time period in which the laser light source device 81b is forcibly caused to continuously emit light, the photosensitive member 22b is emitted with the light beam from the laser light source device 81b.

It is determined whether or not the thus detected rotation number reaches a preset rotation number (here, a specified rotation number) that allows an image to be formed. If the rotation number of the polygon mirror 53 does not reach the set rotation number, a prescribed time is waited while the scanner motor 55 is further accelerated. The laser light source device 81b is forcibly caused to be turned on again. The rotation number of the polygon mirror is measured. The laser light source device 81b is forcibly turned off.

In this embodiment, the rotation number of the polygon mirror 53 determines whether the set rotation number is reached or not at every prescribed time. Thus, in comparison with the case of causing the laser light source device 81 to always emit the light beam and performing determination, degradation and reduction in life of the laser light source device 81 and the photosensitive drum 1 are suppressed, and reduction in image quality due to degradation of the laser light source device 81 and the photosensitive drum 1 can be suppressed.

As described above, a following sequence is repeated until the rotation number of the polygon mirror 53 reaches the specified rotation number (set rotation number) in FIG. 13 (until a determined result by the engine controller 40 becomes a true determination).

"Forcibly turn on the laser light source device 81b"→"Measure the rotation number of the polygon mirror 53"→"Forcibly turn off the laser light source device 81b"

Such rotation control at startup of the scanner motor 55 is adjustment processing for allowing the scanner motor 55 to reach the rotation number (specified rotation number) for performing the image forming processing.

Next, after the rotation number of the polygon mirror 53 reaches the specified rotation number in FIG. 13 (after the determination result of the engine controller 40 becomes the true determination), the rotation control at startup of the scanner motor 55 is completed and the processing enters the steady state rotation control of the scanner motor 55. Thus, the rotation control at startup of the scanner motor 55 is performed by the engine controller 40 accelerating or decelerating the scanner motor 55 after the rotational processing of the scanner motor 55 is started until the specified rotation number in FIG. 13 is reached (until the determination result by the engine controller 40 becomes the true determination).

In the steady state rotation control of the scanner motor 55 after completion of the adjustment processing, the laser to be forcibly turned on is changed from the laser light source device 81b to the laser light source device 81a. The laser light source device 81a is forcibly caused to emit the light beam only on a non-image area, allowing control such that the rotation number of the polygon mirror 53 is converged and maintained to a certain value while the rotation number of the polygon mirror 53 is monitored. Here, the rotation control of the polygon mirror 53 is performed such that the determination result of the engine controller 40 is maintained to be the true determination, thereby allowing the rotation number of the polygon mirror 53 to be maintained constant. The non-image area is a part external to an area which a light beam emitted from the laser light source device 81 reaches (an area emitted with the light beam by the light source device 81) among areas on the photosensitive drum 1 in the direction of the rotational shaft. If the laser light source device 81 is forcibly caused to emit a light beam at a timing when the light beam has not reached the photosensitive drum 1, the non-image area is emitted. Accordingly, as long as the laser light source device 81 only emits a light beam into the non-image area, an amount of toner causing the recording material to be made dirty does not adhere to the photosensitive drum 1 even if the developing sleeve 24 comes into contact with the photosensitive drum 1. If the rotation number of the polygon mirror 53 in a state of being within a prescribed range with respect to the specified rotation number, the rotation number of the polygon mirror 53 can be estimated, and control of forcibly causing the laser light source device 81 to emit a light beam into only the non-image area can be performed.

Here, a state where the developing sleeve 24 contacts with and separates from the photosensitive drum 1 will be described. Processing of the developing sleeve 24 of contacting with and separating from the photosensitive drum 1 is performed by the engine controller 40 controlling a contacting and separating unit that contacts and separates the developing sleeve 24 with and from the photosensitive drum 1.

Before the printing processing is started, the developing sleeves 24 are separated from the respective photosensitive drums 1. In monochrome printing, processing of contacting the developing sleeve 24a with the photosensitive member 22a is started in the rotation control at startup of the scanner motor 55. That is, starting of the processing of contacting the developing sleeve 24a with the photosensitive member 22a is started, in the rotation control at startup of the scanner motor 55, or before the rotation control at startup is finished (before entrance into the steady state rotation control of the scanner motor 55 (before the laser to be forcibly caused to emit the light beam is changed to the laser light source device 81a)). The start of the contact processing of the developing sleeve 24a is not limited to movement of the developing sleeve 24a to the photosensitive member 22a. That is, irrespective of actual movement of the developing sleeve 24a, start of rotation of a cam, not illustrated, that regulates the distance between the photosensitive member 22a and the developing sleeve 24a for contacting the developing sleeve 24a from a stop state in separation of the developing sleeve 24a is included in start of the processing of contacting the developing sleeve 24a.

FIGS. 14A and 14B are timing charts of the detection signal of the horizontal synchronization detector in the steady state rotation control of the scanner motor 55 and emission by the laser light source device 81a, and illustrates in detail the state of emission by the laser light source device 81a in the lower part of FIG. 13. FIG. 14A illustrates the case where the non-image area is emitted for rotation control in a time period before and after video emission for printing processing. FIG. 14B illustrates the case where, in a time period of video emission for printing processing, the image area is subjected to video emission and the non-image area is emitted for rotation control. Here, the image area illustrated in the diagram is an area that can be emitted with a light beam by the laser light source device 81 for forming an image among areas on the photosensitive drum 1 in the direction of the rotational shaft.

In the steady state rotation control of the scanner motor 55, the laser light source device 81a is forcibly caused to emit the non-image area, the horizontal synchronization detector 54 detects the light beam, and, after detection by the horizontal synchronization detector 54, the laser light source device 81a is forcibly turned off. Based on the detection result by the horizontal synchronization detector 54 at this time, the rotation number of the polygon mirror 53 is measured.

In the image area, from image information from an external apparatus, such as a personal computer, the laser light source device 81a performs video emission (emission of a light beam) based on a video signal at timing according to detection timing by the horizontal synchronization detector 54.

Subsequently, the non-image area is forcibly emitted by a laser beam from the laser light source device 81a, the forcible emission by the laser light source device 81a is detected by the horizontal synchronization detector 54, and, after detection by the horizontal synchronization detector 54, the laser light source device 81a is forcibly turned off.

As described above, in the steady state rotation control by the scanner motor 55, the following sequence is repeated.

"Start on the non-image area"→"Forcible emission on the laser light source device 81a"→"Measure the rotation number of the polygon mirror 53"→"Finish on the non-image area"→"Forcibly turn off the laser light source device 81a"→"Start on the image area"→"Video emission"→"Finish on the image area"→"Start on the non-image area"→"Forcible emission by the laser light source device 81a"→"Measure the rotation number of the polygon mirror 53"→"Finish on the non-image area"→ . . . .

Figure 20:
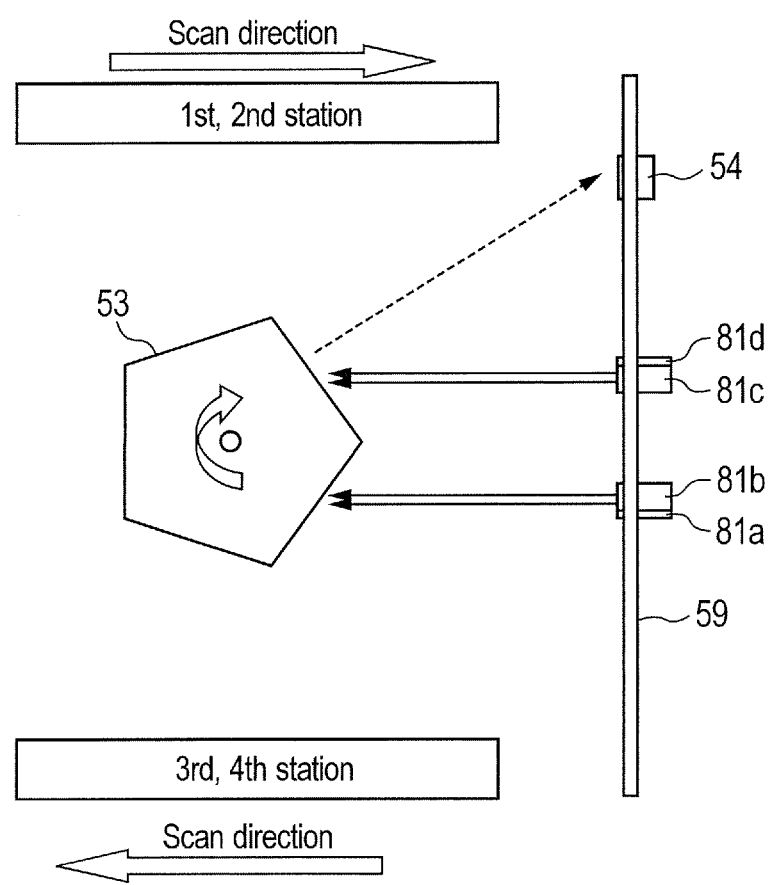
FIG. 20 is a diagram illustrating arrangement of a polygon mirror and a laser substrate in a scanner unit.

Here, in this embodiment, the laser light source device 81b among the laser light source devices 81 is used for the rotation control at startup of the scanner motor 55. The laser light source device 81a is used for the steady state rotation control of the scanner motor 55. However, any laser light source device 81 other than the laser light source device 81 for video emission (for emitting a light beam into any photosensitive member except for the photosensitive member used for monochrome printing processing) may be adopted as the laser light source device 81 used for the rotation control at startup of the scanner motor 55. Any of the laser light source devices 81a to 81d may be adopted as the laser light source device 81 used for the steady state rotation control of the scanner motor 55. For instance, as illustrated in FIG. 20, the horizontal synchronization detector 54 is arranged in a position capable of only detecting the laser light source device 81c, and the laser light source device 81c may be adopted as the rotation control at startup of the scanner motor 55 and the steady state rotation control. In this case, the video emission by the laser light source device 81a is performed at timing based on timing when the horizontal synchronization detector 54 detects a laser beam emitted from the laser light source device 81c on timing when the beam has not reached the photosensitive member 22c.

In the case of monochrome printing of this embodiment, the laser used for the video emission is the laser light source device 81a. However, in the case of single color printing other than monochrome printing, one laser other than the laser light source device 81a is used. In this embodiment, the photosensitive drum 1 used for the rotation control at startup of the scanner motor 55 is arranged upstream of the photosensitive drum 1 used for the steady state rotation control of the scanner motor 55 in the rotational direction of the intermediate transfer belt 30. However, the scope is not limited thereto.

Before the rotation control at startup of the scanner motor 55 using the station that does not form an image is finished, the processing of contacting the developing sleeve 24 with the photosensitive drum 1 is started in the station (K) forming an image. From start of the contact processing to transition to the steady state rotation control of the scanner motor 55, in the station (K) executing image formation, the laser light source device 81 (81a) is not turned on. However, the scope is not limited thereto. That is, the laser light source device 81 (81a) may be caused to emit light such that the intensity of light with which a unit area of the surface of the photosensitive drum 1 (1K) is emitted is a light intensity in an extent where toner from the developing sleeve 24 (24a) does not adhere to the photosensitive drum (1K).

If the rotation number of the polygon mirror 53 reaches the prescribed rotation number (specified rotation number) and subsequently the processing transitions to the steady state rotation control of the scanner motor 55, only the non-image area is forcibly emitted by a light beam with the laser light source device 81. However, the scope is not limited thereto. That is, until it is determined that the rotation number of the polygon mirror 53 is converged to the prescribed rotation number (specified rotation number), the laser light source device 81 in the station that does not form an image performs not only a light beam that is emitted into the non-image area but also a continuous forcible light beam emission into the horizontal synchronization detector 54 during a prescribed time period in which the light beam is incident on the horizontal synchronization detector 54 at a plurality of times.

As described above, in this embodiment, as to the rotation control at startup of the scanner motor 55, the forcible emission with a laser beam is performed by the laser light source device 81 in the station other than the station forming an image (the station for video emission by the laser light source device 81 modulated based on image information on printing). Before the rotation control at startup of the scanner motor 55 using the laser in the station that does not form an image is finished, the processing of contacting the developing sleeve 24 with the photosensitive drum 1 is started in the station forming an image. Accordingly, the underside of the recording material can be prevented from being made dirty owing to forcible emission with a laser beam.

The configuration of this embodiment allows the developing sleeve 24 to come into contact with the photosensitive drum 1 in the rotation control at startup of the scanner motor 55. Accordingly, the start of the video emission by the laser modulated based on image information on printing can be advanced. This advancement can, in turn, advance transfer to the recording material P, and can reduce the first print out time.

In this embodiment, the station (photosensitive member 22b) used for the rotation control at startup of the scanner motor 55 is arranged upstream of the process unit 5 (photosensitive member 22a) used for printing processing in steady state rotation control of the scanner motor 55 in the rotational direction of the intermediate transfer belt 30. In comparison with the case where the station used for the rotation control at startup is arranged downstream of the station used for the printing processing of the steady state rotation control in the rotational direction of the intermediate transfer belt 30, following advantageous effects can be exerted. That is, the time from required for movement of toner carried on the intermediate transfer belt 30 from the primary transfer unit T1 to the secondary transfer unit T2 in the station used for monochrome printing processing can be further reduced. Accordingly, transfer to the recording material P is further advanced, and the first print out time can be further reduced.

In this embodiment, the intermediate transfer image forming apparatus using the intermediate transfer belt 30 has been described. However, the scope is not limited thereto. That is, the present invention can be also appropriately applied to an image forming apparatus that transfers a toner image to a recording material carried and conveyed on the conveyance belt.

Embodiment 5

An image forming apparatus of Embodiment 5 will hereinafter be described. In this embodiment, only configurational elements different from those in Embodiment 4 will be described. Configurational components analogous to those of Embodiment 4 are assigned with the identical symbols. The description thereof is omitted. As with Embodiment 4, in this embodiment, monochrome printing that forms a monochrome image only in the station of the photosensitive drum 22a will be described.

Figure 16:
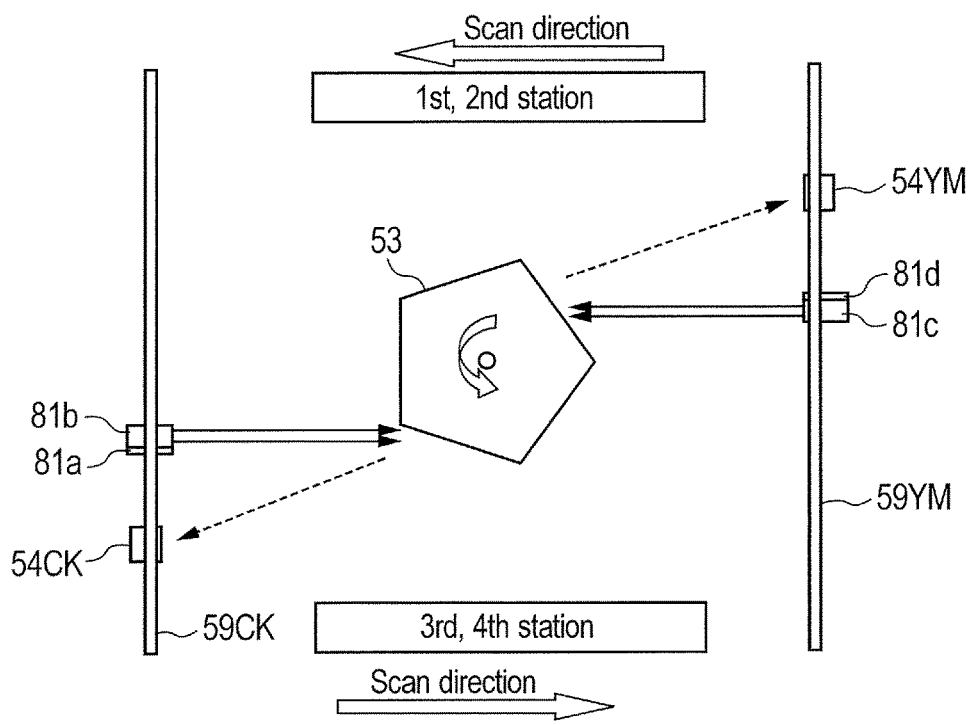
FIG. 16 is a diagram illustrating arrangement of a polygon mirror and a laser substrate in a scanner unit.

FIG. 16 is a diagram illustrating schematic configurations of the polygon mirror 53 and the laser substrate 59 provided in the scanner unit 80 in this embodiment.

In Embodiment 4, one polygon mirror 53 is emitted with light beams in the identical direction. In contrast, this embodiment is different therefrom in that one polygon mirror 53 is emitted in two directions. The details will hereinafter be described.

In this embodiment, the laser light source devices 81c and 81d are mounted (arranged) on a laser substrate 59YM. The laser light source devices 81a and 81b are mounted on a laser substrate 59CK.

The laser substrates 59YM and 59CK are arranged centered at the polygon mirror 53 (so as to sandwich the polygon mirror 53) in a manner facing each other (opposite to each other).

Light beams emitted from the laser light source devices 81c and 81d travel toward the laser substrate 59CK. Light beams emitted from the laser light source devices 81b and 81a travel toward the laser substrate 59YM, thereby causing the polygon mirror 53 to be emitted with each of the beams.

Also in this embodiment, during rotation of the polygon mirror 53, the light beam emitted from the laser light source device 81d and the light beam emitted from the laser light source device 81c are simultaneously scanned by the identical reflection surface of the polygon mirror. Likewise, the light beam emitted from the laser light source device 81b and the light beam emitted from the laser light source device 81a are simultaneously scanned by the identical reflection surface of the polygon mirror. At this time, the reflection surface of the polygon mirror by which the light beam emitted from the laser light source device 81d and the light beam emitted from the laser light source device 81c are simultaneously scanned is different from the reflection surface of the polygon mirror by which the light beam emitted from the laser light source device 81b and the light beam emitted from the laser light source device 81a are simultaneously scanned.

The light beam emitted from the laser light source device 81d or 81c emits the horizontal synchronization detector 54YM. A detection signal of the horizontal synchronization detector 54YM is used for rotation control of the scanner motor 55. The light beam emitted from the laser light source device 81b or 81a emits the horizontal synchronization detector 54CK. From a detection signal of the horizontal synchronization detector 54CK that is generated by the emission, a horizontal synchronization signal in the station of the photosensitive member 22a is generated. Here, in this embodiment, the detection signal of the horizontal synchronization detector 54CK is adopted as the horizontal synchronization signal.

Figure 17:
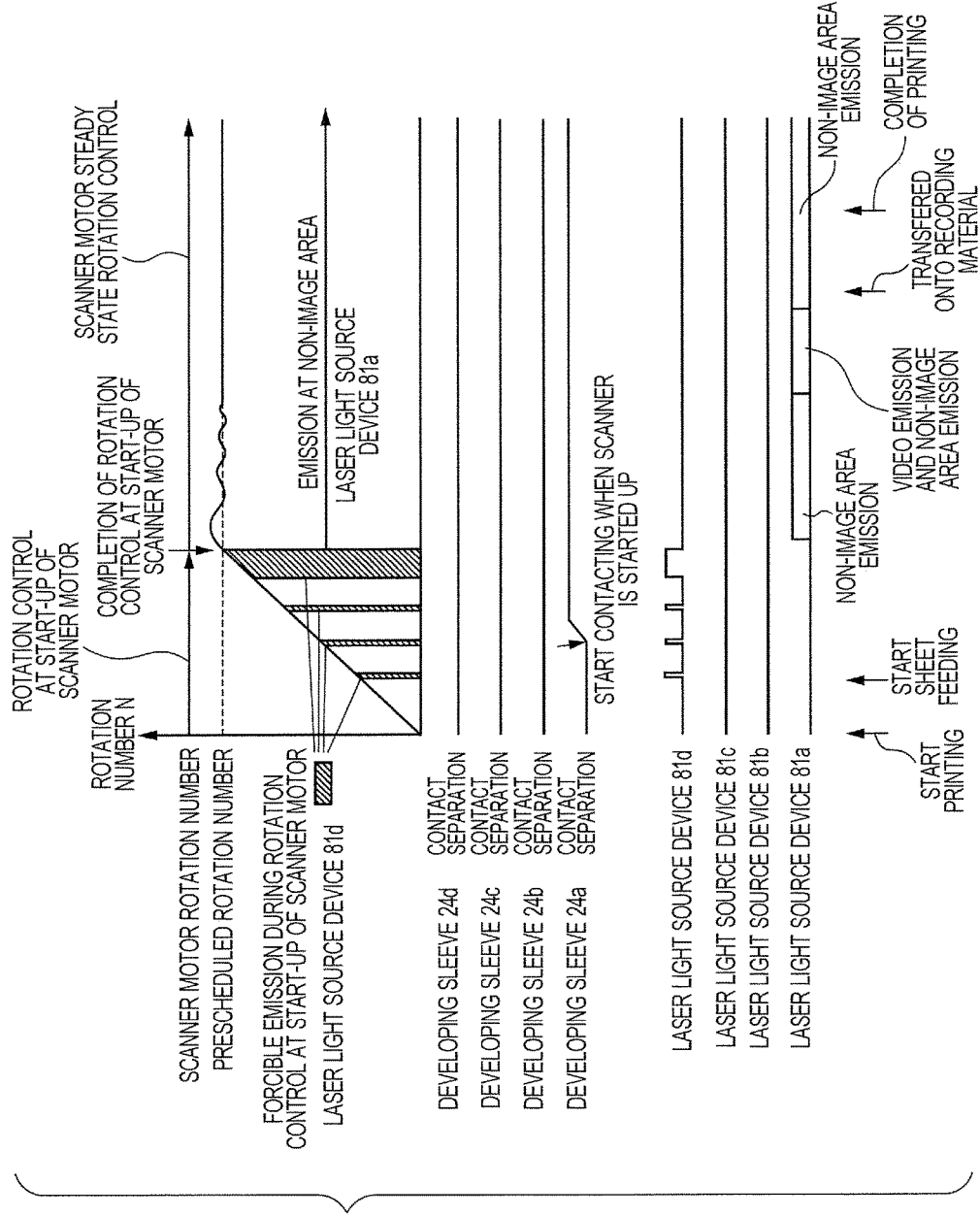
FIG. 17 is a diagram illustrating timing of a printing sequence on and after a printing request.

FIG. 17 is a timing chart illustrating the printing sequence on and after a printing request in this embodiment.

When a printing start instruction for monochrome printing is transmitted from an external apparatus, such as a personal computer, to the image forming apparatus 10, the rotation control at startup of the scanner motor 55 is started, the scanner motor 55 is operated, and the polygon mirror 53 is started to rotate.

After a prescribed time elapses, the laser light source device 81d is forcibly turned on, the rotation number of the polygon mirror 53 is measured from the detection result of the horizontal synchronization detector 54YM, and the laser light source device 81d is forcibly turned off. During the forcible emission of the laser light source device 81d, rotation of the polygon mirror 53 connected to the scanner motor 55 allows the light beam from the laser light source device 81d to enter the horizontal synchronization detector 54YM. Accordingly, the rotation number of the polygon mirror 53 can be detected.

If the rotation number of the polygon mirror 53 does not reach a prescribed rotation number, a prescribed time is waited, the laser light source device 81d is forcibly turned on again, the rotation number of the polygon mirror 53 is measured, and the laser light source device 81d is forcibly turned off.

As described above, the following sequence is repeated until the rotation number of the polygon mirror 53 becomes the prescribed rotation number around the specified rotation number in FIG. 17.

"Forcibly turn on the laser light source device 81d"→"Measure the rotation number of the polygon mirror 53"→"Forcibly turn off the laser light source device 81d"

Next, after the rotation number of the polygon mirror 53 reaches the prescribed rotation number around the specified rotation number in FIG. 17, the rotation control at startup of the scanner motor 55 is completed, and the processing enter the steady state rotation control of the scanner motor 55.

In the steady state rotation control of the scanner motor 55, the laser to be forcibly turned on is changed from the laser light source device 81d to the laser light source device 81a. Only the non-image area is forcibly emitted with the laser light source device 81a. At this time, the light beam emitted from the laser light source device 81a enters the horizontal synchronization detector 54CK. Accordingly, the rotation number of the polygon mirror 53 is detected, and control of maintaining the rotation number of the polygon mirror 53 constant is performed.

The processing of causing the developing sleeve 24a to come into contact with photosensitive member 22a is performed on forcible emission of the laser light source device 81d in the startup control of the scanner motor 55.

Subsequent steady state rotation control of the scanner motor 55 is analogous to that in Embodiment 4.

Here, in this embodiment, the laser light source device 81d among the laser light source devices 81 is used for the rotation control at startup of the scanner motor 55. The laser light source device 81a is used for the steady state rotation control of the scanner motor 55. However, any laser light source device 81 except for the laser light source device 81 for video emission may be adopted as the laser light source device 81 used for the rotation control at startup of the scanner motor 55. Any of the laser light source devices 81a to 81d may be adopted as the laser light source device 81 used for the steady state rotation control of the scanner motor 55.

The laser light source device 81a is adopted as the laser used for video emission in the case of monochrome printing in this embodiment. However, in the case of single color printing other than monochrome printing, one laser other than the laser light source device 81a is used. As described above, this embodiment can also exert advantageous effects analogous to those in Embodiment 4.

Embodiment 6

Figure 18:
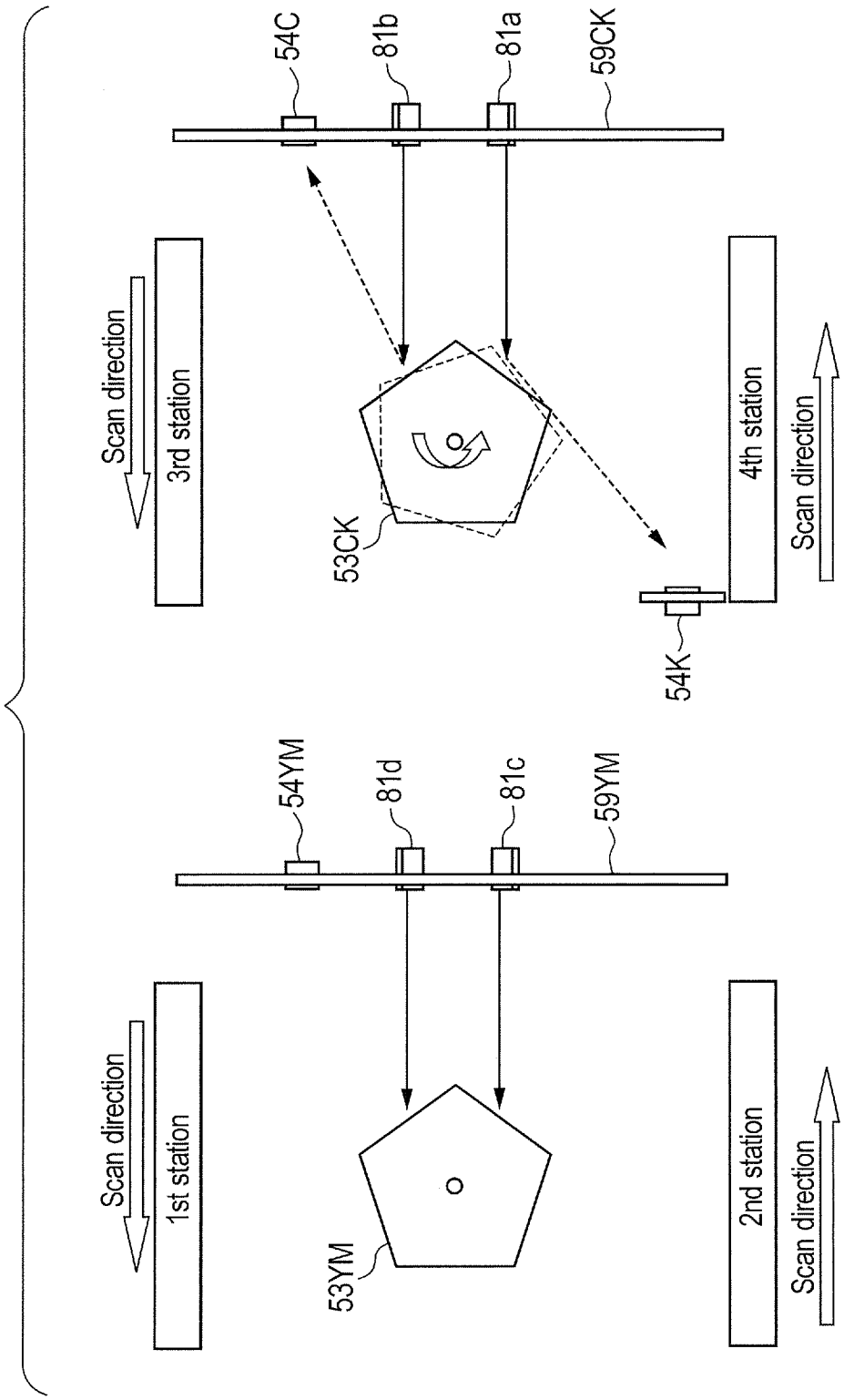
FIG. 18 is a diagram illustrating arrangement of a polygon mirror and a laser substrate in a scanner unit.

Embodiment 6 will hereinafter be described. In this embodiment, configurational components different from those of Embodiments 4 and 5 will be described. The description of configurational components analogous to those of Embodiment 4 is omitted. As with Embodiment 4, in this embodiment, monochrome printing that forms a monochrome image only in the station of the photosensitive drum 22a will be described. FIG. 18 is a diagram illustrating a schematic configuration of the polygon mirror and the laser substrate provided in the scanner unit 80 of this embodiment.

In Embodiment 4, the one polygon mirror 53 is emitted with the light beams in the identical direction. In Embodiment 5, the one polygon mirror 53 is emitted with the light beams in the two directions. In contrast, in this embodiment, two polygon mirrors 53 are provided in the scanner unit 80. Different reflection surfaces of each polygon mirror 53 are used. The different reflection surfaces of the polygon mirror are emitted with light beams emitted from the respective laser light source devices 81. The details thereof will be described below. Here, the scanner unit 80 of Embodiment 1 includes the one polygon mirror 53. In contrast, the scanner unit 80 of this embodiment includes the two polygon mirrors, which are polygon mirrors 53CK and 53YM. This point is different therefrom.

In this embodiment, during rotation of the polygon mirror 53CK, a light beam emitted from the laser light source device 81b and a light beam emitted from the laser light source device 81a are scanned on the different reflection surfaces of the polygon mirror 53CK. During rotation of the polygon mirror 53YM, light beams emitted from the respective laser light source devices 81c and 81d are scanned on the different reflection surfaces of the polygon mirror. However, in the case of monochrome printing, the polygon mirror 53YM does not rotate.

The light beam emitted from the laser light source device 81b emits the horizontal synchronization detector 54C. A detection signal of the horizontal synchronization detector 54C is used for rotation control of the scanner motor 55 of the polygon mirror 53CK. The light beam emitted from the laser light source device 81a emits the horizontal synchronization detector 54K. From the detection signal of the horizontal synchronization detector 54K that is generated by the emission, the horizontal synchronization signal is generated in the station of the photosensitive member 22a. In this embodiment, the detection signal of the horizontal synchronization detector 54K is the horizontal synchronization signal.

Figure 19:
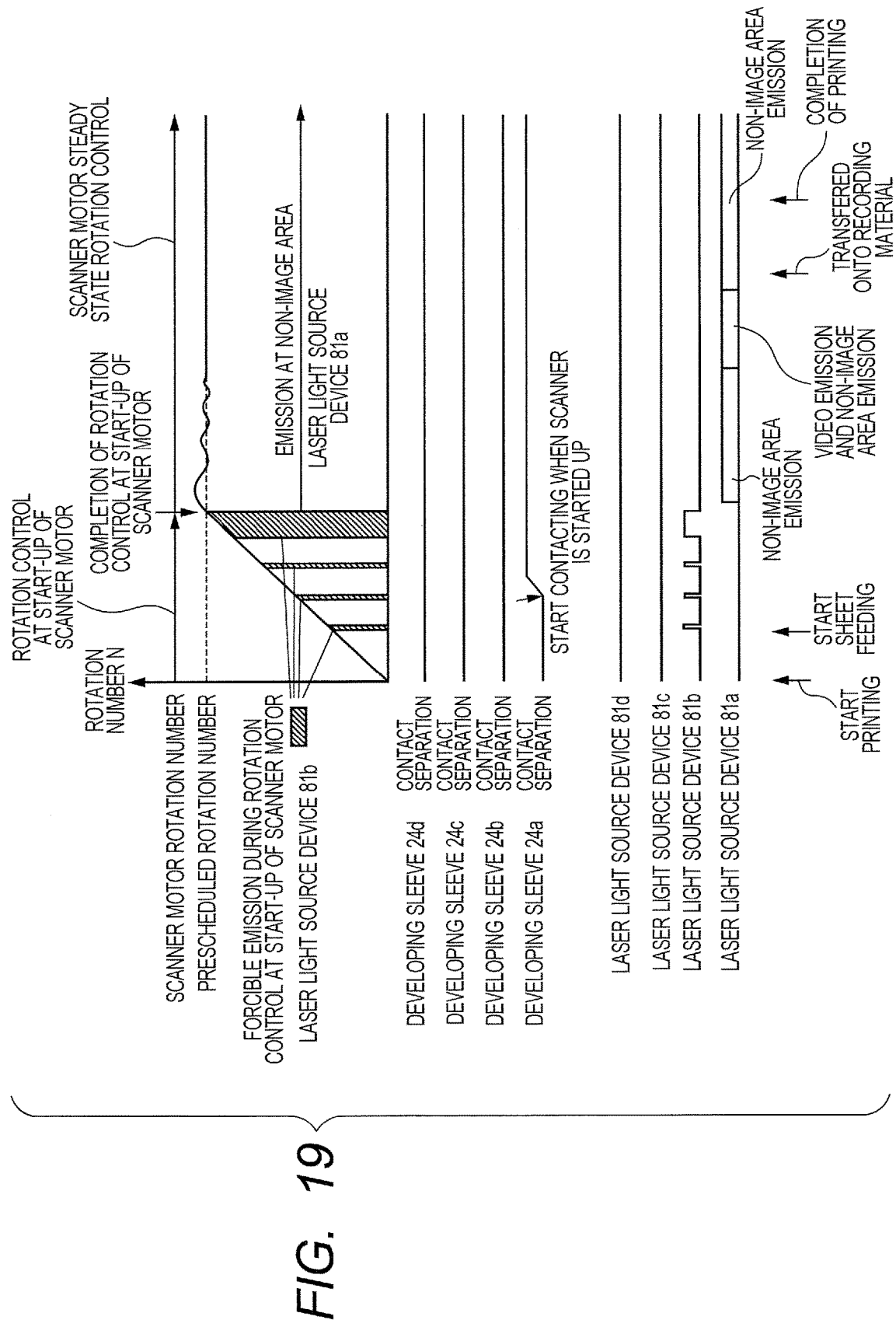
FIG. 19 is a diagram illustrating timing of a printing sequence on and after a printing request.

FIG. 19 is a timing chart illustrating a printing sequence on and after a printing request of this embodiment.

When a printing start instruction for monochrome printing is transmitted from an external apparatus, such as a personal computer, to the image forming apparatus 10, the rotation control at startup of the scanner motor 55 is started, the scanner motor 55 is operated, and the polygon mirror 53CK is started to rotate.

Subsequently, after a prescribed time elapses, the laser light source device 81b is forcibly turned on, the rotation number of the polygon mirror 53CK is detected from a detection result of the horizontal synchronization detector 54C, and the laser light source device 81b is forcibly turned off. During forcibly emission of the laser light source device 81b, rotation of the polygon mirror 53CK connected to the scanner motor 55 allows a light beam from the laser light source device 81b to enter the horizontal synchronization detector 54C, thereby allowing the rotation number of the polygon mirror 53CK to be detected.

If the rotation number of the polygon mirror 53CK does not reach a prescribed rotation number, a prescribed time is waited, the laser light source device 81b is forcibly turned on again, the rotation number of the polygon mirror 53 is measured, and the laser light source device 81b is forcibly turned off.

As described above, the following sequence is repeated until the rotation number of the polygon mirror 53CK becomes a prescribed rotation number around a specified rotation number in FIG. 19.

"Forcibly turn on the laser light source device 81b"→"Measure the rotation number of the polygon mirror 53CK"→"Forcibly turn off the laser light source device 81b"

Next, when the rotation number of the polygon mirror 53CK reaches the prescribed rotation number around the specified rotation number in FIG. 19, the rotation control at startup of the scanner motor 55 is completed and the processing enters the steady state rotation control of the scanner motor 55.

In the steady state rotation control of the scanner motor 55, the laser to be forcibly turned on is changed from the laser light source device 81b to the laser light source device 81a. Only the non-image area is emitted by the laser light source device 81a. At this time, the light beam emitted from the laser light source device 81a enters the horizontal synchronization detector 54K. Accordingly, the rotation number of the polygon mirror 53 is detected. Control of maintaining the rotation number of the polygon mirror 53 constant is performed.

Processing of contacting the developing sleeve 24a with the photosensitive member 22a is performed on forcible emission of the laser light source device 81b in the startup control of the scanner motor 55.

Subsequent steady state rotation control of the scanner motor 55 is analogous to that in Embodiment 4.

Here, in this embodiment, the laser light source device 81a among the laser light source devices 81 is used for the steady state rotation control of the scanner motor 55. However, the laser light source device 81 used for the steady state rotation control of the scanner motor 55 may be the laser light source device 81b.

In the case of the monochrome printing of this embodiment, the laser used for video emission is the laser light source device 81a. However, in the case of a single color printing other than the monochrome printing, one laser other than the laser light source device 81a is used.

As described above, this embodiment can also exert advantageous effects analogous to those in Embodiment 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-289106, filed Dec. 28, 2011, Japanese Patent Application No. 2012-225309, filed Oct. 10, 2012, and Japanese Patent Application No. 2012-274676, filed Dec. 17, 2012 which are hereby incorporated by reference herein in their entirety.

What is claimed is:

1. An image forming apparatus comprising:
first and second image forming devices each of which includes a photosensitive member, a light source that emits a light beam, and a developing member movable between a developing position for developing a latent image formed on the photosensitive member and a retracted position retracted from the developing position;
a polygon mirror that rotates and reflects each of the light beams emitted from the light sources of the first and second image forming devices; and
a detector that detects the light beam emitted from the light source of the second image forming device and reflected by the polygon mirror,
wherein both of the first and second image forming devices are capable of forming latent images on the respective photosensitive members by reflecting the light beams emitted from the light sources with the polygon mirror and emitting the light beams to the photosensitive members, and developing the latent image in order from the first image forming device to the second image forming device by the developing member that is positioned at the developing position,
wherein the second image forming device performs a light emitting processing to emit the light beam from the light source of the second image forming device into the photosensitive member of the second image forming device and the detector so as to detect the light beam at the detector, and the developing member of the first image forming device reaches the developing position before the light emitting processing is finished.

2. An image forming apparatus according to claim 1, wherein the second image forming device performs the light emitting processing before the first image forming device forms a latent image on the photosensitive member.

3. An image forming apparatus according to claim 1, comprising an adjustment device that performs adjustment processing of adjusting a rotation velocity of the polygon mirror based on an output of the detector of during the light emitting processing.

4. An image forming apparatus according to claim 1, wherein the developing member of the second image forming device is positioned at the retracted position retracted from the developing position during the light emitting processing.

5. An image forming apparatus according to claim 1, wherein the light source of the first image forming device does not emit a light beam during the light emitting processing.

6. An image forming apparatus according to claim 1, wherein the developing member is in contact with the corresponding photosensitive member at the developing position.

7. An image forming apparatus according to claim 1, wherein after the light emitting processing is finished, the light source of the second image forming device emits the light beam at a timing when the light beam has not reached the corresponding photosensitive member of the second image forming device, and the detector detects the light beam emitted at the timing when the light beam has not reached the corresponding photosensitive member, and
the light source of the first image forming device emits the light beam according to an image data based on the timing detected by the detector.

8. An image forming apparatus according to claim 1, comprising an endless belt that is contactable with the photosensitive members of the first and second image forming devices,
wherein the photosensitive member of the second image forming device is provided on a downstream side of the first image forming device in a rotation direction of the endless belt.

9. An image forming apparatus according to claim 1, wherein a light beam emitted from the light source of the second image forming device is emitted into a portion from the photosensitive member of the second image forming device to the detector by the light emitting processing.

10. An image forming apparatus according to claim 1, wherein the light beam emitted from the light source of the second image forming device is emitted into a portion from the detector to the photosensitive member of the second image forming device by the light emitting processing.

11. An image forming apparatus according to claim 1, wherein the detector detects the light beam multiple times.

* * * * *